United States Patent
Nakayama et al.

(10) Patent No.: US 8,392,756 B2
(45) Date of Patent: Mar. 5, 2013

(54) STORAGE APPARATUS AND METHOD OF DETECTING POWER FAILURE IN STORAGE APPARATUS

(75) Inventors: Yosuke Nakayama, Odawara (JP); Tetsuya Inoue, Odawara (JP); Masato Ogawa, Chigasaki (JP); Takakatu Mizumura, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 12/811,154

(22) PCT Filed: Jun. 17, 2010

(86) PCT No.: PCT/JP2010/004035
§ 371 (c)(1),
(2), (4) Date: Jun. 29, 2010

(87) PCT Pub. No.: WO2011/158294
PCT Pub. Date: Dec. 22, 2011

(65) Prior Publication Data
US 2011/0314325 A1    Dec. 22, 2011

(51) Int. Cl.
*G06F 11/00* (2006.01)
(52) U.S. Cl. ............ 714/14; 711/114; 413/300; 714/22
(58) Field of Classification Search ............... 711/114; 713/300; 714/14, 22
See application file for complete search history.

(56) References Cited

U.S. PATENT DOCUMENTS

| | | | |
|---|---|---|---|
| 6,993,680 B2* | 1/2006 | Fukumori | 714/14 |
| 7,051,216 B2* | 5/2006 | Suzuki et al. | 713/300 |
| 7,051,233 B2* | 5/2006 | Fukumori et al. | 714/14 |
| 7,131,014 B2* | 10/2006 | Suzuki et al. | 713/300 |
| 7,279,810 B2* | 10/2007 | Nitta | 307/64 |
| 7,536,576 B2* | 5/2009 | Shima et al. | 713/340 |
| 7,558,988 B2* | 7/2009 | Ishii et al. | 714/42 |
| 7,581,137 B2* | 8/2009 | Okada et al. | 714/24 |
| 7,681,061 B2* | 3/2010 | Suzuki et al. | 713/340 |
| 7,698,595 B2* | 4/2010 | Inoue et al. | 714/14 |
| 7,774,650 B2* | 8/2010 | Elliott et al. | 714/24 |
| 8,015,434 B2* | 9/2011 | Makino et al. | 714/6.1 |
| 2003/0200471 A1 | 10/2003 | Suzuki et al. | |
| 2003/0217300 A1* | 11/2003 | Fukumori et al. | 713/300 |
| 2004/0068670 A1* | 4/2004 | Suzuki et al. | 713/300 |
| 2005/0216777 A1* | 9/2005 | Suzuki et al. | 713/300 |
| 2006/0238032 A1* | 10/2006 | Nitta | 307/64 |
| 2007/0016811 A1* | 1/2007 | Suzuki et al. | 713/300 |
| 2007/0255968 A1* | 11/2007 | Suzuki et al. | 713/300 |
| 2007/0260917 A1* | 11/2007 | Inoue et al. | 714/14 |
| 2007/0260918 A1* | 11/2007 | Okada et al. | 714/14 |
| 2009/0063901 A1* | 3/2009 | Suzuki et al. | 714/25 |
| 2010/0049916 A1 | 2/2010 | Nakajima et al. | |
| 2012/0151262 A1* | 6/2012 | Nakayama et al. | 714/22 |

FOREIGN PATENT DOCUMENTS

JP    2003-316520 A    11/2003

* cited by examiner

*Primary Examiner* — Joshua P Lottich
(74) *Attorney, Agent, or Firm* — Mattingly & Malur, PC

(57) ABSTRACT

A storage apparatus has a physical storage area used by an external apparatus, a drive interface unit, a power supply unit, and a storage controller executing data write processing from the external apparatus to the storage drive and data read processing from the storage drive through the drive interface unit, and a drive control interface unit. The power supply unit inputs power supply information to the drive interface unit. Any one of the processing units acquires the power supply information of the power supply unit through a data network path to the drive interface unit for the data write processing and the data read processing, and determines whether or not a failure occurs in the power supply unit supplying the operation power to the storage drive and the drive interface unit, on the basis of the acquired power supply information.

13 Claims, 33 Drawing Sheets

EXAMPLE OF CONVENTIONAL POWER FAILURE DETECTION SYSTEM

EXAMPLE OF POWER FAILURE DETECTION SYSTEM
IN PRESENT EMBODIMENT (EXAMPLE 1)

Fig. 17

OWNERSHIP MANAGEMENT TABLE 1500

| MP NUMBER | \multicolumn{6}{c|}{LDEV NUMBER} | REPRESENTATIVE MP | REDUNDANT REPRESENTATIVE MP | MANAGEMENT MP |
|---|---|---|---|---|---|---|---|---|---|
| | 01 | 02 | 03 | 04 | 05 | 06 | | | |
| 00 | 1 | 1 | 0 | 0 | 0 | 0 | 1 | 0 | A |
| 01 | 0 | 0 | 1 | 1 | 0 | 0 | 0 | 1 | A |
| 02 | 0 | 0 | 1 | 1 | 0 | 0 | 0 | 0 | A |
| 03 | 0 | 0 | 0 | 0 | 1 | 1 | 0 | 0 | A |
| 10 | 1 | 1 | 0 | 1 | 0 | 0 | 0 | 0 | A |
| 11 | 0 | 0 | 1 | 1 | 0 | 0 | 0 | 0 | A |
| 12 | 0 | 0 | 1 | 0 | 0 | 1 | 0 | 0 | A |
| 13 | 0 | 0 | 0 | 0 | 1 | 1 | 0 | 0 | A |

Fig. 18

OWNERSHIP MANAGEMENT TABLE 1500

| MP NUMBER | LDEV NUMBER | | | | | | REPRESENTATIVE MP | REDUNDANT REPRESENTATIVE MP | MANAGEMENT MP |
|---|---|---|---|---|---|---|---|---|---|
| | 01 | 02 | 03 | 04 | 05 | 06 | | | |
| 00 | 1 | 1 | 0 | 0 | 0 | 0 | C1 | 0 | C1 |
| 01 | 0 | 0 | 1 | 1 | 0 | 0 | 0 | C1 | C1 |
| 02 | 0 | 0 | 1 | 1 | 0 | 0 | 0 | 0 | C1 |
| 03 | 0 | 0 | 0 | 0 | 1 | 1 | 0 | 0 | C1 |
| 10 | 1 | 1 | 0 | 0 | 0 | 0 | C2 | 0 | C2 |
| 11 | 0 | 0 | 1 | 1 | 0 | 0 | 0 | C2 | C2 |
| 12 | 0 | 0 | 1 | 1 | 0 | 0 | 0 | 0 | C2 |
| 13 | 0 | 0 | 0 | 0 | 1 | 1 | 0 | 0 | C2 |

1501  1502  1503  1504  1505

COMMAND ISSUING MP CORRESPONDENCE TABLE 1600

STORAGE APPARATUS AND METHOD OF DETECTING POWER FAILURE IN STORAGE APPARATUS

FIELD OF INVENTION

The present invention relates to a storage apparatus and a method of detecting a power failure in a storage apparatus, and particularly relates to a storage apparatus and a method of detecting a power failure in a storage apparatus, which employ a more simplified hardware configuration and are capable of surely and quickly detecting and then dealing with a failure occurring in a power supply system of the storage apparatus.

BACKGROUND ART

A storage apparatus is an apparatus including a storage medium such as a hard disk drive (hereinafter, "HDD") or a solid state drive (hereinafter, "SSD") and providing a storage area for data to be processed by an application and other programs running on a host computer or the like, and is also referred to as a disk subsystem.

In recent years, there has been an increasing demand that storage apparatuses should achieve further power saving, space saving, higher-density packaging, and cost down for manufacturing and maintenance. A power failure of a storage apparatus is a serious failure that may lead to a system down in a data center or the like which is required to operate continuously with high reliability. In order to surely and quickly detect and then deal with such a power failure, a configuration has been employed in which a dedicated power supply monitor circuit is provided to a drive control board for an HDD, and is coupled to a control processor in a disk controller or the like with a dedicated interface (wiring), for example.

This configuration provided with the dedicated power supply monitor circuit and the dedicated interface, however, cannot sufficiently meet the foregoing demand, for example, for achievement of higher-density packaging, and cost down for manufacturing.

In this respect, Patent Literature (PTL) 1 proposes a configuration employed in a power control device including an HDD having a plurality of Fibre Channel interface ports, an HDD drive unit having a plurality of Fibre Channel controllers each including a Fibre Channel interface to the HDD and a Fibre Channel control interface, and an HDD control logic unit having a plurality of HDD control logics for controlling read/write accesses to the HDD. In this configuration, each of the Fibre Channel controllers includes a power supply control circuit for controlling a power supply of the HDD drive unit by using a Fibre Channel control interface control signal supplied from each of the HDD control logics to a corresponding one of the Fibre Channel control interfaces.

CITATION LIST

Patent Literature

[PTL 1]
Japanese Patent Application Laid-open Publication No. 2003-316520

SUMMARY OF INVENTION

Technical Problem

The configuration proposed in PTL 1, however, transmits and receives information on a power failure through the same route as the path for an ordinary data I/O command. For this reason, at the occurrence of a power failure, this configuration requires time to identify a location where the failure occurs and to retry commands influenced by the failure, and therefore may inevitably lead to deterioration in the system performance. In addition, this configuration also has a problem from the viewpoint of a market demand for reduction in maintenance cost because a maintenance person having professional skills needs to work on the failure recovery process.

The present invention has been made in view of the foregoing problems. One object of the present invention is to provide a storage apparatus and a method of detecting a power failure in a storage apparatus, which employ a more simplified hardware configuration and are capable of surely and quickly detecting and then dealing with a failure occurring in a power supply system of the storage apparatus.

Solution to Problem

In order to solve the foregoing and other problems, a first aspect of the present invention is a storage apparatus comprising: a storage drive configured to provide a physical storage area for creating a logical storage area to be used by an external apparatus; a drive interface unit configured to input and output data to and from the storage drive; a power supply unit configured to supply operation power to the storage drive and the drive interface unit; and a storage controller including a plurality of processing units and a drive control interface unit, the processing units configured to execute, via the drive interface unit, data write processing from the external apparatus to the storage drive and data read processing from the storage drive, and the drive control interface unit configured to issue a command to the drive interface unit in response to a request from each of the processing units. The power supply unit inputs power supply information to the drive interface unit, the power supply information indicating an operation state of the power supply unit. Any one of the plurality of processing units acquires the power supply information of the power supply unit through a data network path to the drive interface unit for the data write processing and the data read processing, and determines whether or not a failure occurs in the power supply unit supplying the operation power to the storage drive and the drive interface unit, on the basis of the acquired power supply information.

Other matters such as objects and solutions disclosed in the present application will be clarified in the following section of "Description of Embodiments" and the drawings.

Advantageous Effects of Invention

According to the present invention, provided are a storage apparatus and a method of detecting a power failure in a storage apparatus, which employ a more simplified hardware configuration and are capable of surely and quickly detecting and then dealing with a failure occurring in a power supply system of the storage apparatus.

BRIEF DESCRIPTION OF DRAWINGS

FIG. 17 is a diagram showing an example of an ownership management table 1500.

FIG. 18 is a diagram showing an example of the ownership management table 1500.

DESCRIPTION OF EMBODIMENTS

Hereinafter, with reference to the accompanying drawings, the present invention will be described based on embodiments of the present invention.

Figure 1:
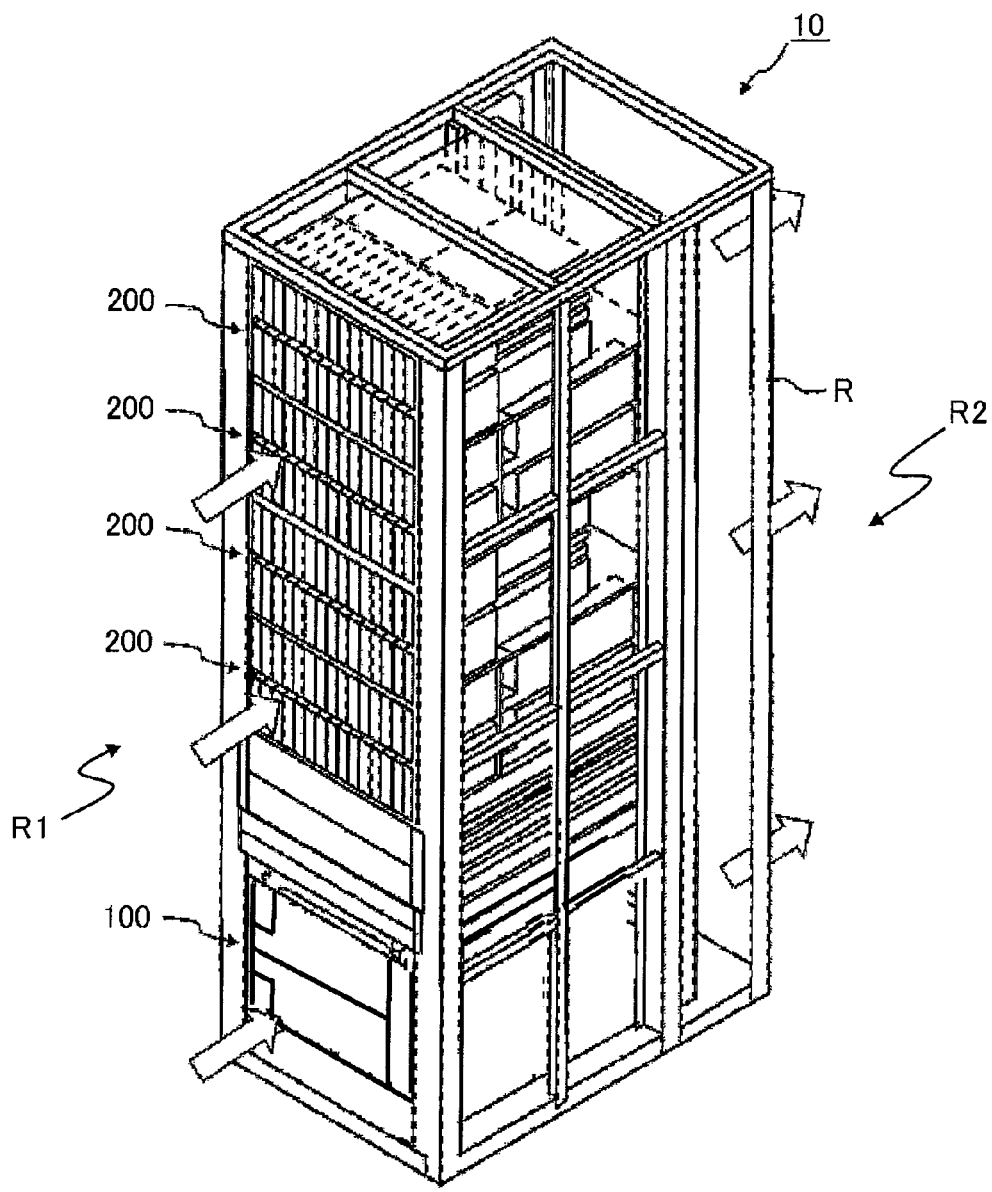
FIG. 1 is a view of an external appearance of a storage apparatus 10 according to an embodiment of the present invention.

Overview of Configuration of Storage Apparatus
Configuration of Storage Apparatus Firstly, a configuration of a storage apparatus 10 according to an embodiment will be described. FIG. 1 shows an exemplary external appearance of the storage apparatus 10 according to an embodiment of the present invention.

The storage apparatus 10 includes a rack R to which a controller device 100 and a plurality of drive unit devices 200 are detachably attached. Here, FIG. 1 shows the configuration in which the controller device 100 is provided in a lowest portion of the storage apparatus 10 and the plurality of drive unit devices 200 are arranged in a stacked manner above the controller device 100. However, the arrangement of the controller device 100 and the drive unit devices 200 is not limited to the example shown in FIG. 1.

The rack R includes a front-face portion R1 and a rear-face portion R2 located at the rear side of the front-face portion R1. As shown by hollow thick arrows in FIG. 1, cooling air for cooling the inside of the controller device 100 and the drive unit devices 200 is introduced from the front-face portion R1 of the rack R and is discharged from the rear-face portion R2 of the rack R.

Figure 2:
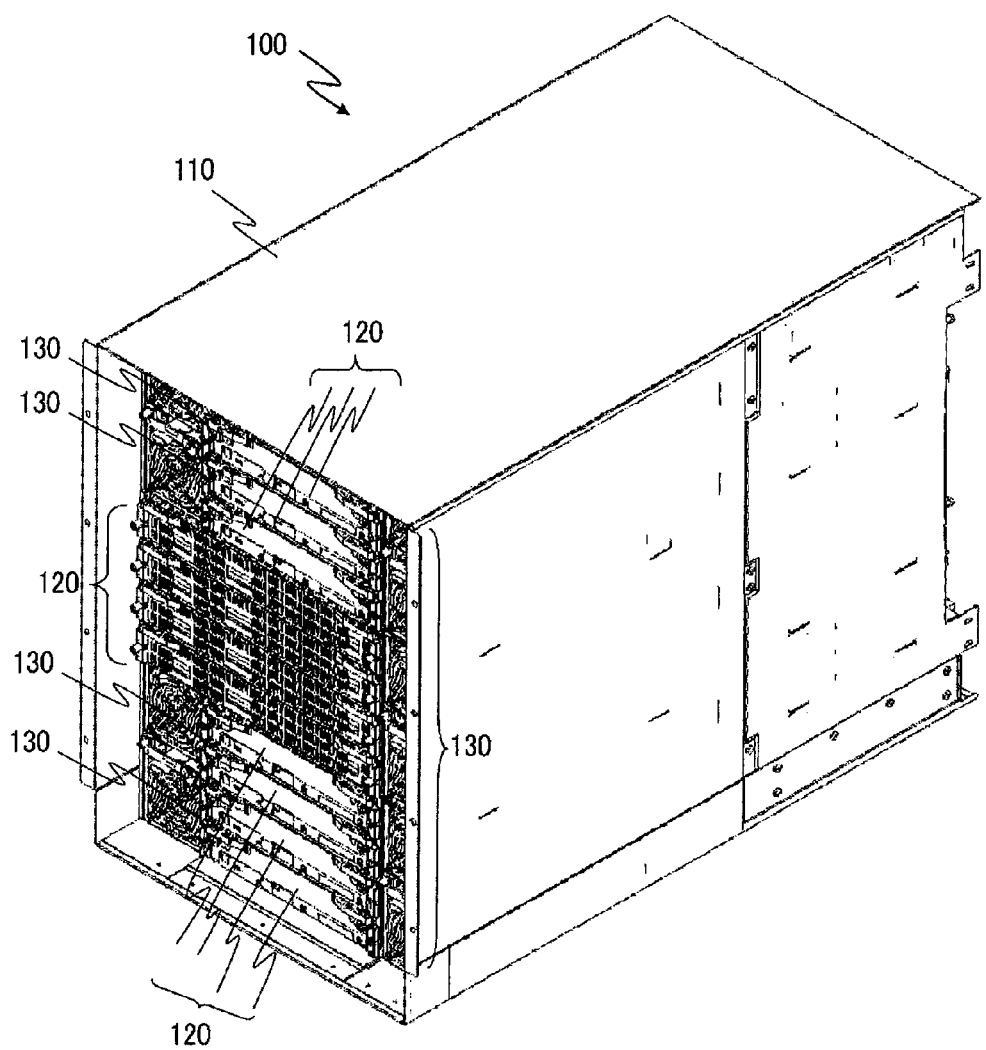
FIG. 2 is a view of an external appearance of a controller device 100 included in the storage apparatus 10 according to an embodiment of the present invention.

FIG. 2 shows an exemplary external appearance of the controller device 100 included in the storage apparatus 10. The controller device 100 has a rack-mount type structure with an almost rectangular parallelepiped shape, and includes a chassis 110 formed into an almost rectangular tubular shape by assembling a plurality of almost-rectangular metal plates, circuit modules 120 housed inside the chassis 110, and fans 130 for cooling these circuit modules 120. As shown in FIG. 1, the controller device 100 is housed in the rack R together with the other drive unit devices 200.

The circuit modules 120 are circuit units each of which houses therein circuit components such as a processor, a memory, a network switch, and a network interface circuit for executing control of inputting and outputting data to and from storage drives which will be described later. The fans 130 are electric cooling fans capable of exerting predetermined designed performance, and are arranged in a pattern shown in FIG. 2, for example.

The chassis 110 is configured with such a shape and dimensions that twelve units of the circuit modules 120 can be housed in a vertically stacked manner, but the configuration of the chassis 110 is not particularly limited to the illustrated one.

Figure 3:
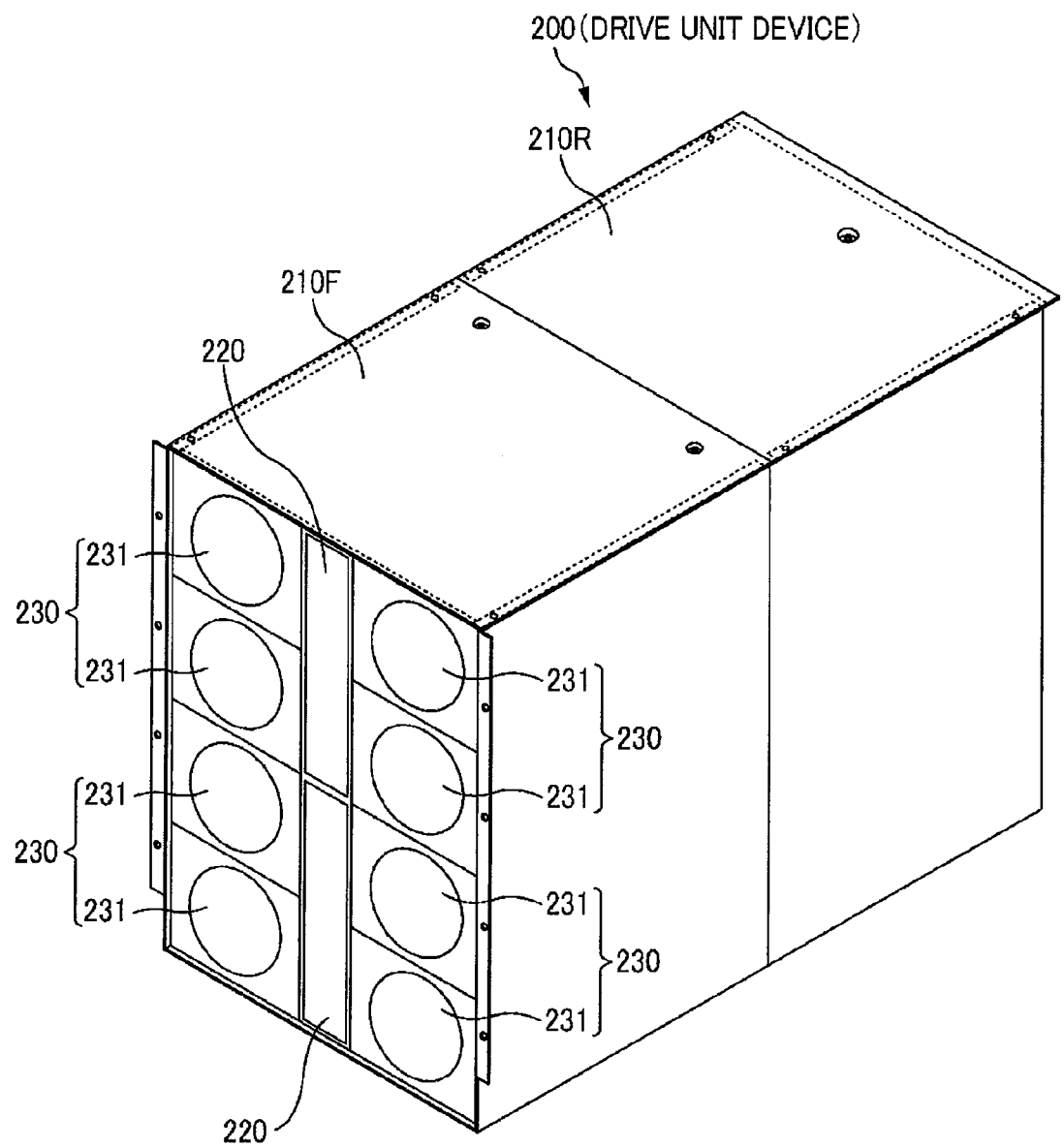
FIG. 3 is a view of an external appearance of a drive unit device 200 included in the storage apparatus 10 according to an embodiment of the present invention.

FIG. 3 shows an exemplary external appearance of one of the drive unit devices 200 included in the storage apparatus 10. The drive unit device 200 houses therein a storage drive such as an HDD that provides a physical storage area as the storage apparatus 10, an input-output control circuit thereof, and the like. The drive unit device 200 has a rack-mount type structure with an almost rectangular parallelepiped shape as similar to the controller device 100, and includes chassis 210F, 210R each formed into an almost rectangular tubular shape by assembling a plurality of almost-rectangular metal plates.

The chassis 210F, 210R each include an internally-mounted storage drive (not shown), an internally-mounted circuit unit (not shown) including a storage drive control circuit, fans 231 and fan driving power supply units (hereinafter, "fan power supplies") 220 for driving the fans 231. The chassis 210F, 210R are configured with internal device layouts which are practically the same, and are coupled to each other at their rear faces to form a single drive unit device 200.

The fans 231 are electric fans for generating air flows for cooling internal devices, as described for the fans 130 of the controller device 100. In the drive unit device 200, the fans 231 have a function of cooling the embedded storage drive and storage drive control circuit. Any type of fans appropriately selected from fans, such as AC fans or DC fans, generally used for cooling information apparatuses can be used as the fans 231. In addition, the fan 231 described here collectively means air blowing devices called other names such as a blower.

In the drive unit device 200 illustrated in FIG. 3, a fan unit 230 is formed by mounting two fans 231 on a fan member made of a synthetic resin or the like, and two fan units 230 are attached on each of the right and left sides of the front face of each of the chassis 210F, 210R. Thus, both the chassis 210F, 210R have a configuration in which four fans 231 arranged side by side vertically are attached on either side of the front face of the chassis. The fan power supplies 220 are placed in a center portion of the front face of the chassis 210F, 210R in such a manner as to be interposed between the fans 231 in the right-left direction. Two of the fan power supplies 220 are arranged side by side vertically, and supply operation power to each of the fans 231 in a dual system. For the fan power supplies 220, any type can be selected appropriately which is suitable for controlling the employed fans 231.

System Configuration of Storage Apparatus 10

Figure 4:
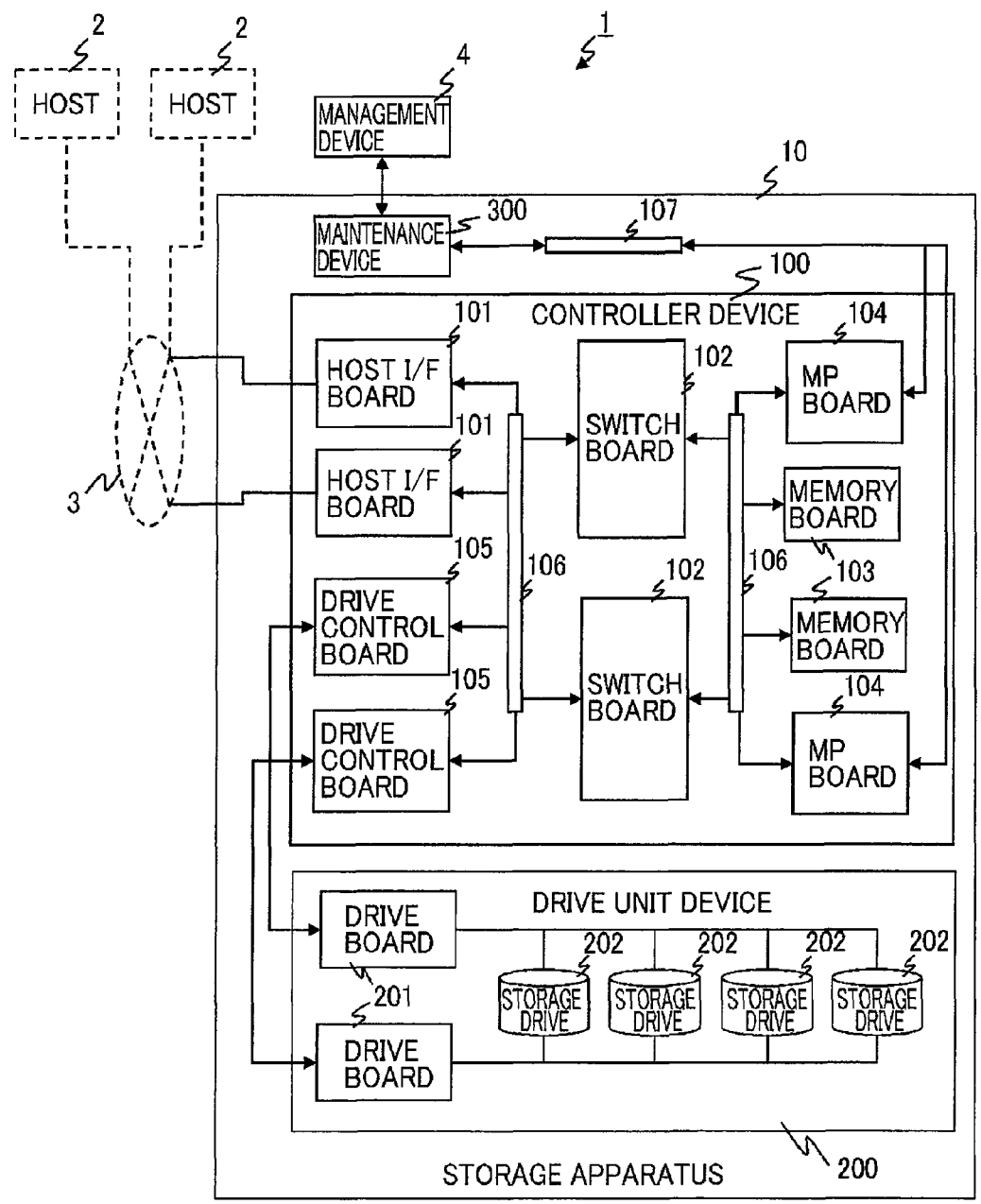
FIG. 4 is a hardware configuration diagram of the storage apparatus 10.

Next, a system configuration of the storage apparatus 10 in the present embodiment will be explained. FIG. 4 shows an exemplary hardware configuration of the storage apparatus 10. The storage apparatus 10 forms a storage system 1 while being communicatively coupled to at least one host computer (hereinafter, "host") 2 through a communication network 3.

The communication network 3 includes a LAN (Local Area Network), a SAN (Storage Area Network), a WAN (Wide Area Network), the internet, a public telecommunication network, a lease line and the like. Communications through the communication network 3 are performed in conformity with protocols such as TCP/IP, iSCSI (internet Small Computer System Interface), Fibre Channel Protocol, FICON (Fiber Connection) (registered trademark), ESCON (Enterprise Systems Connection) (registered trademark), ACONARC (Advanced Connection Architecture) (registered trademark), and FIBARC (Fibre Connection Architecture) (registered trademark), for example.

The host 2 (external apparatus) is an information apparatus (computer) using a logical storage area (data storage area) provided by the storage apparatus 10. The host 2 is configured with a personal computer, a main frame, an office computer or the like. When accessing the storage area, the host 2 sends the storage apparatus 10 a data frame (hereinafter, "frame") including a data I/O request (a data write request, a data read request or the like).

The storage apparatus 10 accesses a recording medium in response to the I/O request sent from the host 2, and transmits data or a response to the host 2. The storage apparatus 10 includes the controller device 100 and the drive unit device 200. In the example shown in FIG. 4, the storage apparatus 10 is provided with a single controller device 100 and a single drive unit device 200. Two or more of controller devices 100 and/or two or more of drive unit devices 200 may be provided and coupled, however, to improve processing performance.

The controller device 100 (storage controller) processes a data I/O request received from the host 2, and executes data write processing, data read processing and other processing together with the drive unit device 200. In the present embodiment, the controller device 100 includes host interface boards (hereinafter, "host I/F boards") 101, switch boards 102, memory boards 103, MP (Microprocessor) boards 104 and drive control boards 105. These boards are communicatively coupled to each other through internal networks 106 using communication protocols such as Fibre Channel, iSCSI and TCP/IP.

The host I/F boards 101 each receive a frame sent from the host 2, and send the host 2 a frame including a response (for example, read data, a read completion report, and a write completion report) resulting from the processing for the data I/O request included in the received frame. Here, the following description is provided on the assumption that the frame is a frame of Fibre Channel (FC frame (FC: Fibre Channel)).

The switch boards 102 are each configured with a high-speed crossbar switch, for example, and execute switching for transfer of control commands and data between the host I/F boards 101, the memory boards 103, the MP boards 104 and the drive control boards 105.

The memory boards 103 are each configured with a fast access RAM (Random Access Memory), for example. The memory board 103 is provided with a cache memory which stores therein data such as data to be written to the storage drives (hereinafter, "write data"), and data read from the storage drives (hereinafter, "read data"), and also is provided with a shared memory which stores therein various types of information (such as tables) used to control the storage apparatus 10.

The MP boards 104 (processing unit boards) are each configured to execute processing for data transfer performed between the host I/F board 101, the drive control board 105 and the cache memory of the memory board 103, in response to the data I/O request included in the frame received by the host I/F board 101. The MP board 104 executes processing such as: passing data (data read from the below-described storage drive 202 or data to be written to the storage drive 202) between the host I/F board 101 and the drive control board 105 through the cache memory; staging data to be stored in the cache memory (reading data from the storage drive 202) or destaging data stored in the cache memory (writing data to the storage drive 202). In addition, in the present embodiment, a microprocessor (hereinafter, "MP") (processing unit) mounted on the MP board 104 performs processing for power supply monitoring and power failure detection. The processing for power supply monitoring and power failure detection by the MP will be described later.

The drive control boards 105 each communicate with a drive board 201 of the drive unit device 200 when reading data from the storage drive 202 and writing data to the storage drive 202.

The drive unit device 200 includes the drive boards 201 and a plurality of storage drives 202. Each of the storage drives 202 is a storage medium such as an HDD or SSD having an interface such as SAS (Serial Attached SCSI), SATA (Serial ATA), FC (Fibre Channel), PATA (Parallel ATA) or SCSI, for example. The drive board 201 executes processing of receiving data from the drive control board 105 of the controller device 100, and storing the data into the storage drive 202;

processing for a control command received from the drive control board 105 of the controller device 100; and other processing. Note that, the drive boards 201 and the storage drives 202 may be provided in any number based on the design requirement or the like, regardless of the example shown in FIG. 4.

The drive unit device 200 provides a host 2 with storage areas in units of logical storage areas provided by controlling the storage drives 202 in a method such as RAID (Redundant Array of Inexpensive (or Independent) Disks) or the like. The logical storage area is a logical device (Logical DEVice, hereinafter called "LDEV" (unit logical storage area)) which is configured with a RAID group (parity group), for example. In addition, the storage apparatus 10 provides the host 2 with a logical storage area (Logical Unit or Logical Volume, hereinafter called "LU") (logical volume) configured with a LDEV. The storage apparatus 10 manages correspondence (relationship) between the LU and the LDEV, and identifies a LDEV corresponding to a LU or a LU corresponding to a LDEV, on the basis of the correspondence. An LDEV for data I/O processing is allocated to each of MPs mounted on the MP board 104, which will be described later.

Figure 5:
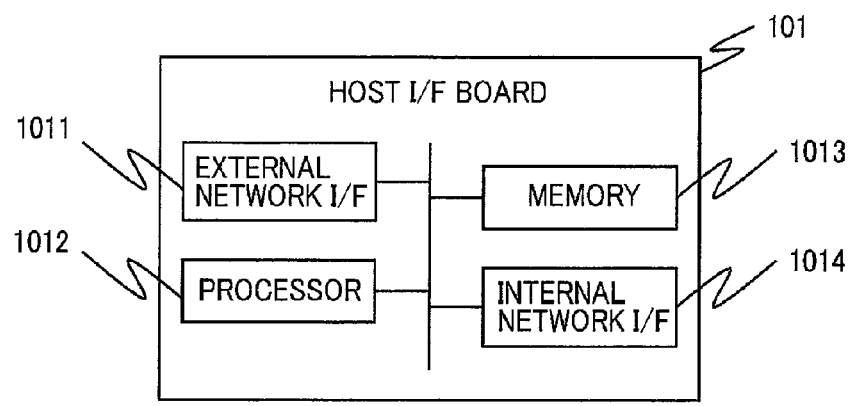
FIG. 5 is a hardware configuration diagram of a host interface board 101 provided in the controller device 100.

FIG. 5 shows a hardware configuration of the host I/F board 101. As shown in FIG. 5, the host I/F board 101 includes an external network interface (hereinafter, "external network I/F") 1011 having a port (network port) for communicating with the host 2, a processor 1012 (including a frame processing chip and a frame transfer chip to be described later), a memory 1013 and an internal network interface (hereinafter, "internal network I/F") 1014 having a port (network port) for communicating with the MP boards 104.

The external network I/F 1011 is configured with a NIC (Network Interface Card), a HBA (Host Bus Adaptor) or the like. The processor 1012 is configured with a CPU (Central Processing Unit), a MPU (Micro Processing Unit) or the like. The memory 1013 is a RAM (Random Access Memory) or a ROM (Read Only Memory). The memory 1013 stores a microprogram therein. The processor 1012 implements various types of functions provided by the host I/F board 101 by loading the microprogram from the memory 1013 and then executing the microprogram. The internal network I/F 1014 communicates with the MP boards 104, the drive control boards 105 and the memory boards 103 through the internal networks 106 and the switch boards 102.

Figure 6:
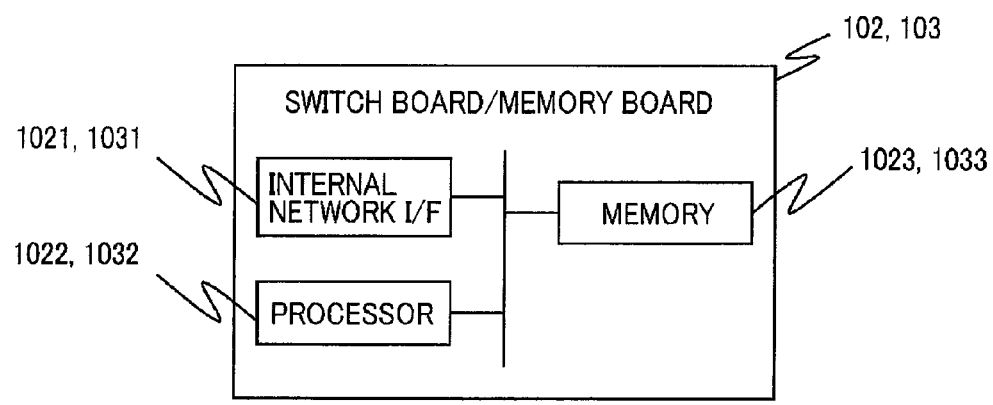
FIG. 6 is a hardware configuration diagram of a switchboard 102 and a memory board 103 provided in the controller device 100.

FIG. 6 shows a hardware configuration of the switch board 102 and the memory board 103. As shown in FIG. 6, the switchboard 102 and the memory board 103 include processors 1022, 1032, memories 1023, 1033 and internal network I/F 1021, 1031, respectively.

The processors 1022, 1032 are configured with a CPU, a MPU or the like. The memory 1023, 1033 is a RAM or a ROM. The memory 1023 of the switch board 102 stores therein a microprogram which is loaded and executed by the processor 1022 for implementing various types of switching functions. The memory 1033 of the memory board 103 is used as a cache memory and a shared memory. The internal network I/F 1021, 1031 communicates with the MP boards 104 and the drive control boards 105 through the internal networks 106 and the switch boards 102. Note that, the memory board 103 may not be necessarily equipped with the processor 1032, in particular.

Figure 7:
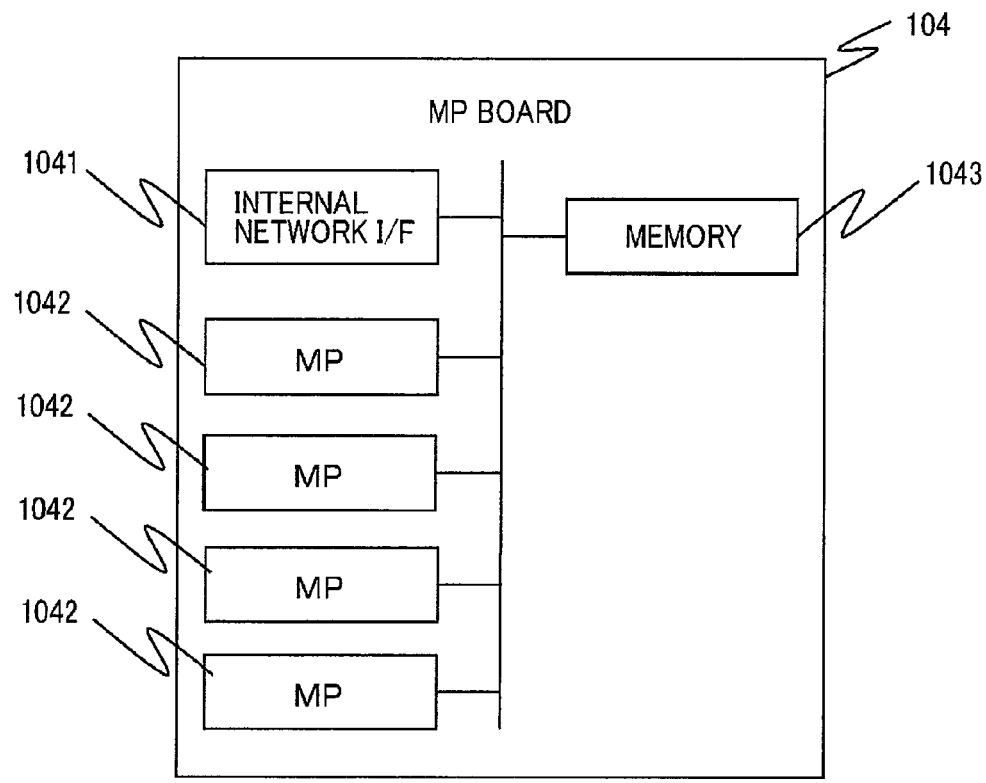
FIG. 7 is a hardware configuration diagram of an MP board 104 provided in the controller device 100.

FIG. 7 shows a hardware configuration of the MP board 104. The MP board 104 includes an internal network I/F 1041, MPs 1042, and a (fast access) memory 1043 (local memory) accessible at a higher speed from the MPs 1042 than the memory 1033 of the memory board 103. The memory 1043 stores a microprogram therein. The MPs 1042 implement various types of functions provided by the MP board 104 by loading the microprogram from the memory 1043 and then executing the microprogram.

The internal network I/F 1041 communicates with the host I/F boards 101, the drive control boards 105 and the memory boards 103 through the internal networks 106 and the switch boards 102. The MP 1042 is configured with a CPU, a MPU, a DMA (Direct Memory Access) or the like. The memory 1043 is a RAM or a ROM. The MP 1042 is capable of accessing any of the shared memories formed by the memory 1043 and the memories 1033 of the memory boards 103. In the example shown in FIG. 7, four MPs 1042 are mounted on a single MP board 104. However, the number of the mounted MPs 1042 can be determined appropriately according to the design requirements or the like.

Figure 8:
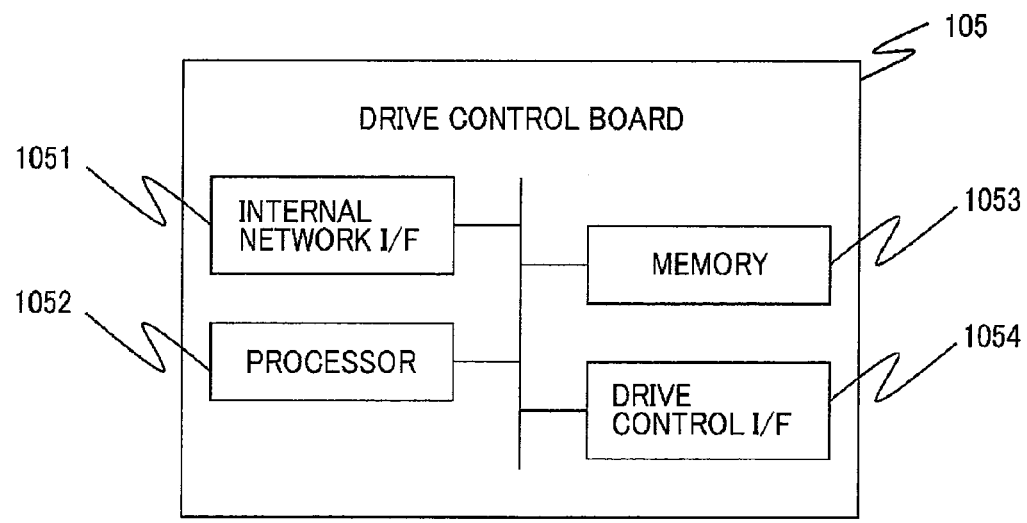
FIG. 8 is a hardware configuration diagram of a drive control board 105 provided in the controller device 100.

FIG. 8 shows a hardware configuration of the drive control board 105. The drive control board 105 includes an internal network I/F 1051, a processor 1052, a memory 1053 and a drive control interface (hereinafter, "drive control I/F") 1054. The memory 1053 stores a microprogram therein. The processor 1052 implements various types of functions provided by the drive control board 105 by loading the microprogram from the memory 1053 and then executing the microprogram.

The internal network I/F 1051 communicates with the host I/F boards 101, the MP boards 104 and the cache memories and the shared memories formed by the memories 1033 of the memory boards 103, through the internal networks 106 and the switchboards 102. The processor 1052 is configured with a CPU, a MPU or the like. The memory 1053 is a RAM or ROM, for example. The drive control I/F 1054 communicates with the drive board 201 of the drive unit device 200.

Figure 9:
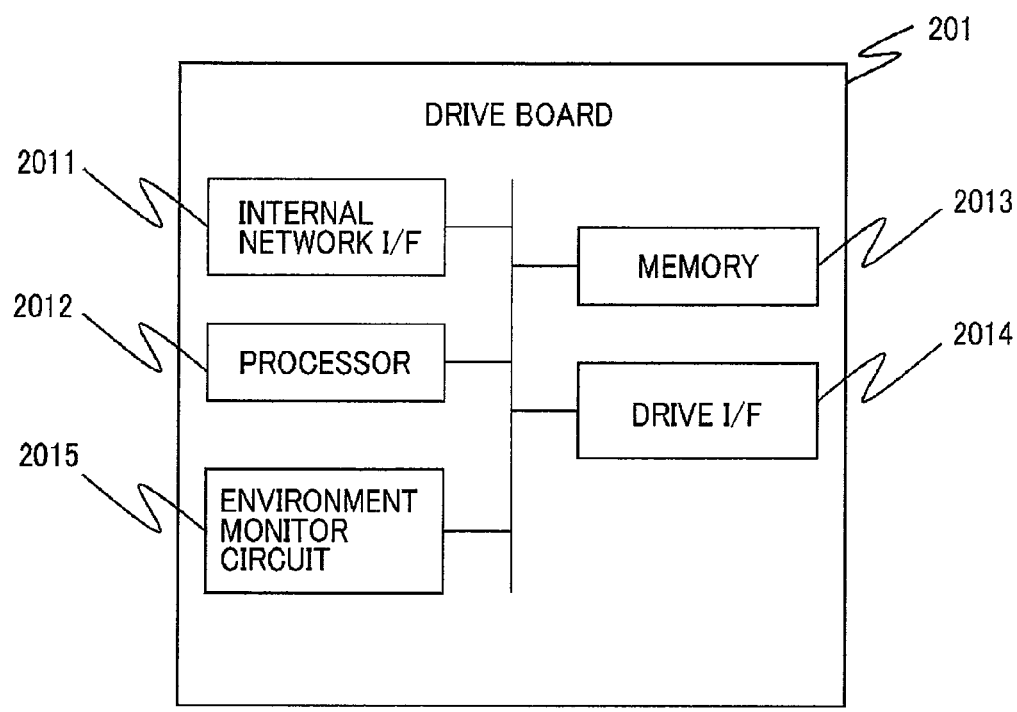
FIG. 9 is a hardware configuration diagram of a drive board 201 provided in the drive unit device 200.

FIG. 9 shows a hardware configuration of the drive board 201. The drive board 201 includes an internal network I/F 2011, a processor 2012, a memory 2013, a drive interface (hereinafter, "drive I/F") 2014 and an environment monitor circuit 2015. The memory 2013 stores a microprogram therein. The processor 2012 implements various types of functions provided by the drive board 201 by loading the microprogram from the memory 2013 and then executing the microprogram.

The internal network I/F 2011 communicates with the drive control board 105 of the controller device 100 through an inter-chassis wiring. The processor 2012 is configured with a CPU, an MPU or the like. The memory 2013 is a RAM or ROM, for example. The drive I/F 2014 is a block that communicates with the storage drives 202, and can be configured with a so-called one-chip microcomputer in which a CPU and memory are packaged as a single unit, for example.

The environment monitor circuit 2015 monitors the operating status of the storage apparatus 10 in real time, and acquires at any time measurement values sent from sensors installed in various positions in the storage apparatus 10. The sensors include, for example, a temperature sensor, a voltage sensor, a current sensor, a frost sensor and a revolving speed sensor that measures the number of revolutions of the fan 231. The environment monitor circuit 2015 is configured with a one-chip microcomputer, for example, as similar to the drive I/F 2014.

As will be described later, the processing for power supply monitoring and power failure detection in the present embodiment uses power supply information such as the value of a power supply output voltage inputted to the drive I/F 2014 from a drive unit power supply (described later). The drive I/F 2014 performs communications using frames used for data input/output between the storage drive 202 and the MP 1042 on the MP board 104 that is executing the processing for power supply monitoring and power failure detection.

For example, the drive I/F 2014 can use a spare data area in a SAS based frame to provide the MPs 1042 with data of power supply voltage values and the like. Therefore, a dedicated network line for the above purpose does not have to be provided between the MP boards 104 and the drive board 201. This produces effects of simplifying the internal configuration and the internal wiring in the storage apparatus 10.

Here, return to FIG. 4. A maintenance device (Service Processor: "SVP") 300 controls component elements in the storage apparatus 10 and monitors the states of the component elements. The maintenance device 300 is a personal computer, an office computer or the like. The maintenance device 300 communicates with the component elements in the storage apparatus 10, such as the host I/F boards 101, the MP boards 104, the drive control boards 105, the memory boards 103 and the switch boards 102, through network means such as the internal networks 106 and a LAN 107 at any time, thereby acquires operation information or the like from each of the component elements, and then provides the operation information to a management device 4. In addition, the maintenance device 300 makes setting and performs control and maintenance (including new installation and update of software) of each of the component elements on the basis of the operation information and control information transmitted from the management device 4.

The management device 4 is a computer communicatively coupled to the maintenance device 300 through a LAN or the like. The management device 4 includes a user interface using GUI (Graphical User Interface), CLI (Command Line Interface) or the like for controlling and monitoring the storage apparatus 10.

Figure 10:
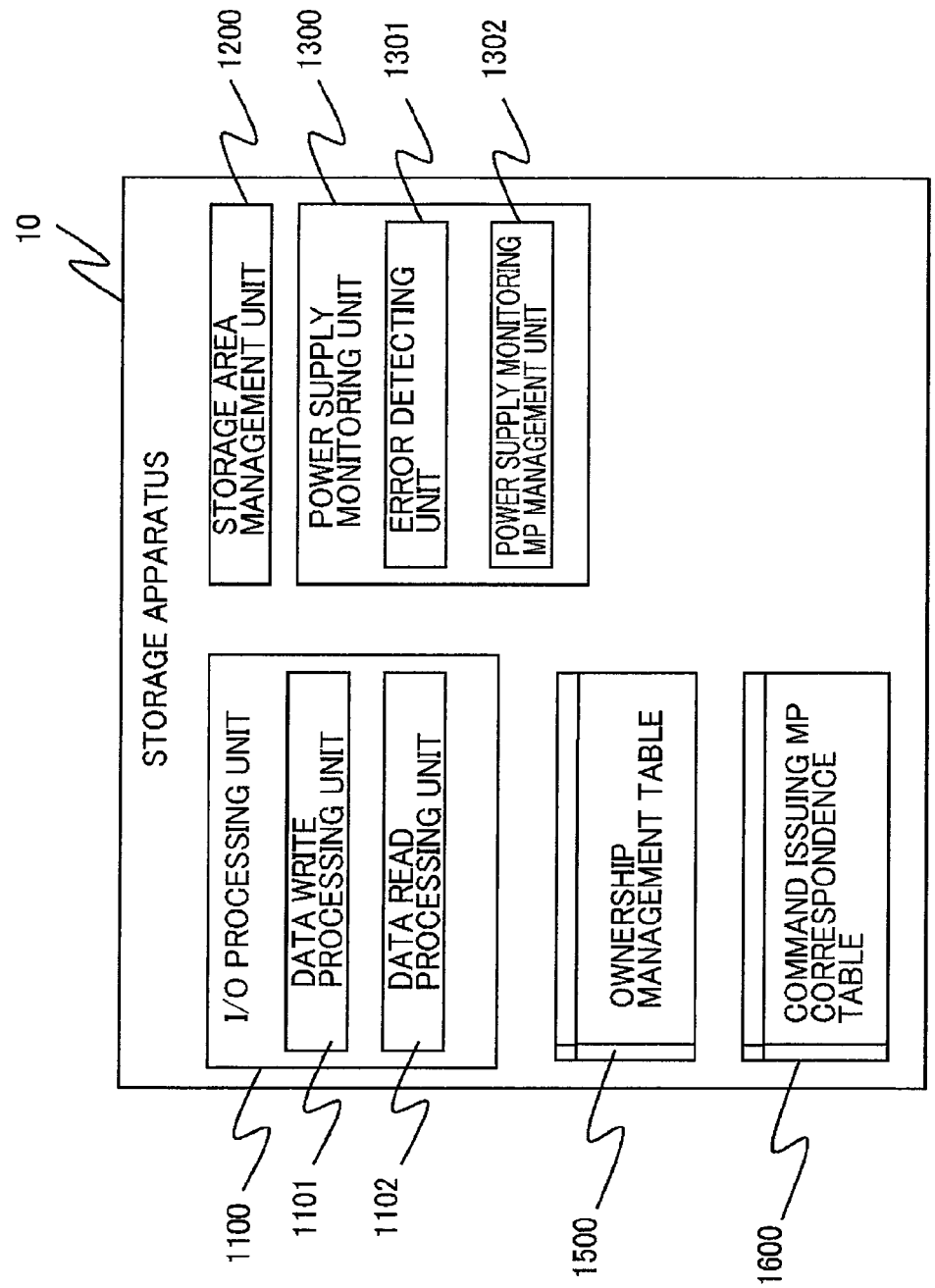
FIG. 10 is a software configuration diagram of the storage apparatus 10.

Next, a software configuration of the storage apparatus 10 will be described. FIG. 10 shows an exemplary software configuration of the storage apparatus 10. As shown in FIG. 10, the storage apparatus 10 includes an I/O processing unit 1100, a storage area management unit 1200, and a power supply monitoring unit 1300.

The I/O processing unit 1100 includes a data write processing unit 1101 that performs processing for writing data to the drive unit device 200, and a data read processing unit 1102 that performs processing for reading data from the drive unit device 200.

The storage area management unit 1200 is provided to allow the MPs 1042 mounted on each of the MP boards 104 in the controller device 100 to perform data input/output processing on their corresponding LDEVs. Specifically, according to an instruction from the storage area management unit 1200, each of the MPs 1042 executes processing on the corresponding LDEV in reference to an ownership management table 1500, which will be described later.

The power supply monitoring unit 1300 is a block that has a function to monitor the state of the drive unit power supply of the drive unit device 200 through the same path as the aforementioned path to the storage drive 202 for the data I/O command. The power supply monitoring unit 1300 includes an error detecting unit 1301 and a power supply monitoring MP management unit 1302. The error detecting unit 1301 is a functional block that executes various kinds of processing for power failure, which will be described later, on the basis of power supply information or power failure information transmitted from the drive I/F 2014 on the drive board 201 in the drive unit device 200. The power supply monitoring MP management unit 1302 is a functional block that determines an MP (representative processing unit, hereinafter "representative MP") that actually executes the processing for power supply monitoring and power failure detection, and executes processing in the case where the representative MP has a failure.

Note that, functions of the I/O processing unit 1100, the storage area management unit 1200, and the power supply monitoring unit 1300 are implemented in such a way that the hardware included in the host I/F boards 101, the drive control boards 105 and the like in the storage apparatus 10, or any of the MPs 1042 mounted on the MP boards 104 loads and executes the microprogram stored in the memory 1043. In addition, the ownership management table 1500 and a command issuing MP correspondence table 1600 will be described later.

Data I/O Processing of Storage Apparatus 10

Next, data I/O processing on the storage drives 202 executed by the storage apparatus 10 having the foregoing configuration will be described. This data I/O processing is general processing executed by the storage apparatus 10.

Figure 11:
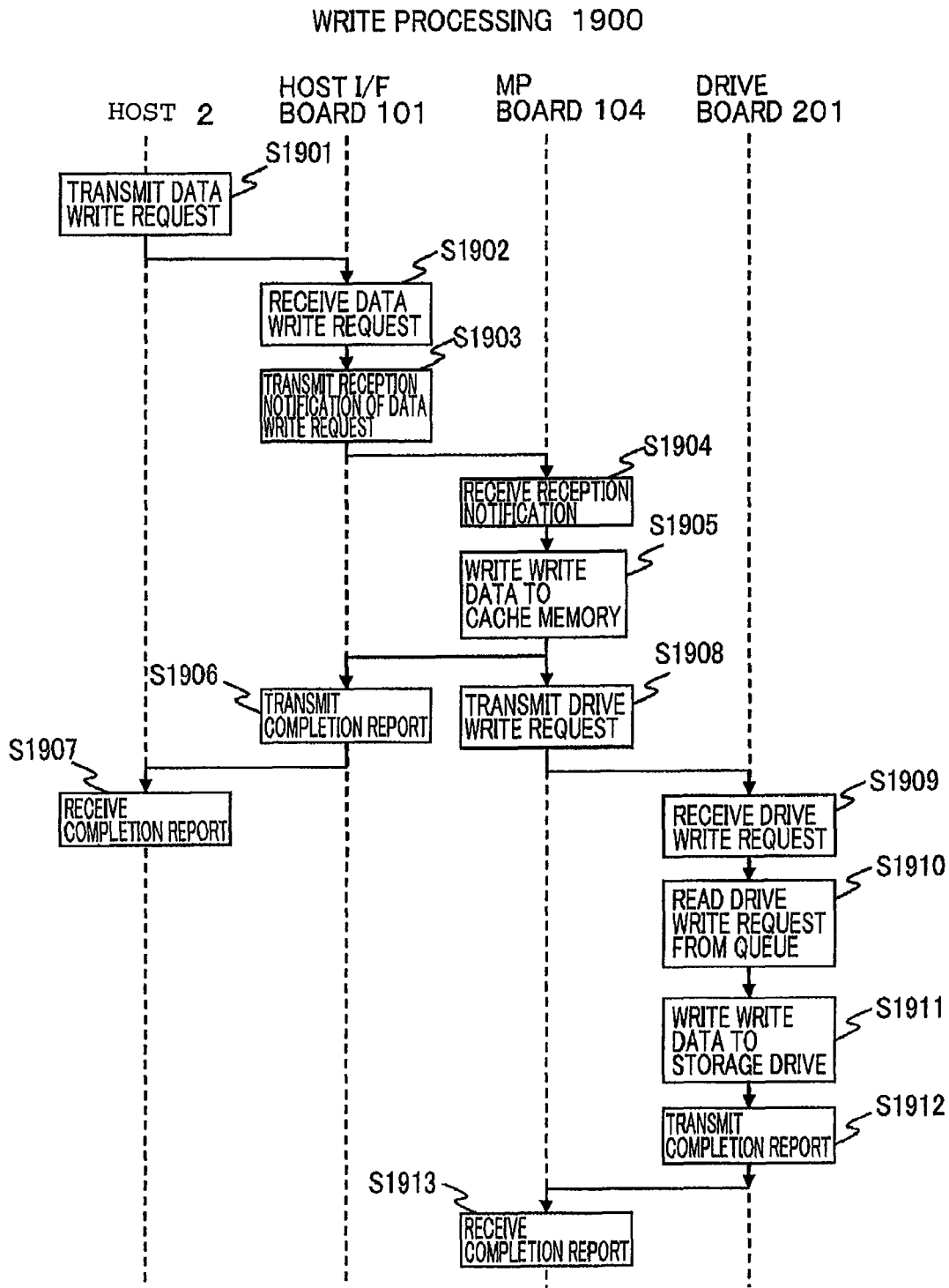
FIG. 11 is a diagram showing an exemplary data write processing flow in the storage apparatus 10.

FIG. 11 is a flowchart for explaining processing (hereinafter, "data write processing 1900") that the data write processing unit 1101 of the I/O processing unit 1100 executes when the storage apparatus 10 receives a frame including a data write request from the host 2. Hereinafter, the data write processing 1900 will be described with reference to FIG. 11. In the following explanation, the letter "S" attached in front of a reference number denotes step.

A frame sent from the host 2 is received by the host I/F board 101 of the storage apparatus 10 (S1901, S1902). Upon receipt of the frame, the host I/F board 101 notifies the MP board 104 of the reception (S1903).

Upon receipt of the notification from the host I/F board 101 (S1904), the MP board 104 generates a drive write request based on the data write request in the frame, and stores the generated drive write request in the memory 1033 (cache memory) of the memory board 103 (S1905). Then, the MP board 104 transmits the generated drive write request to the drive board 201 (S1908). The host I/F board 101 transmits a completion report to the host 2 (S1906), and the host 2 receives the completion report (S1907).

The drive board 201 receives the drive write request and then registers the request in a write processing waiting queue (S1909). The drive board 201 reads the drive write request from the write processing waiting queue as needed (S1910). The drive board 201 reads write data specified by the read drive write request from the memory 1033, and writes the read write data into the storage drive 202 (S1911).

After that, the drive board 201 sends the MP board 104 a report (completion report) indicating a completion of writing of the write data for the drive write request (S1912), and the MP board 104 receives the sent completion report (S1913).

Figure 12:
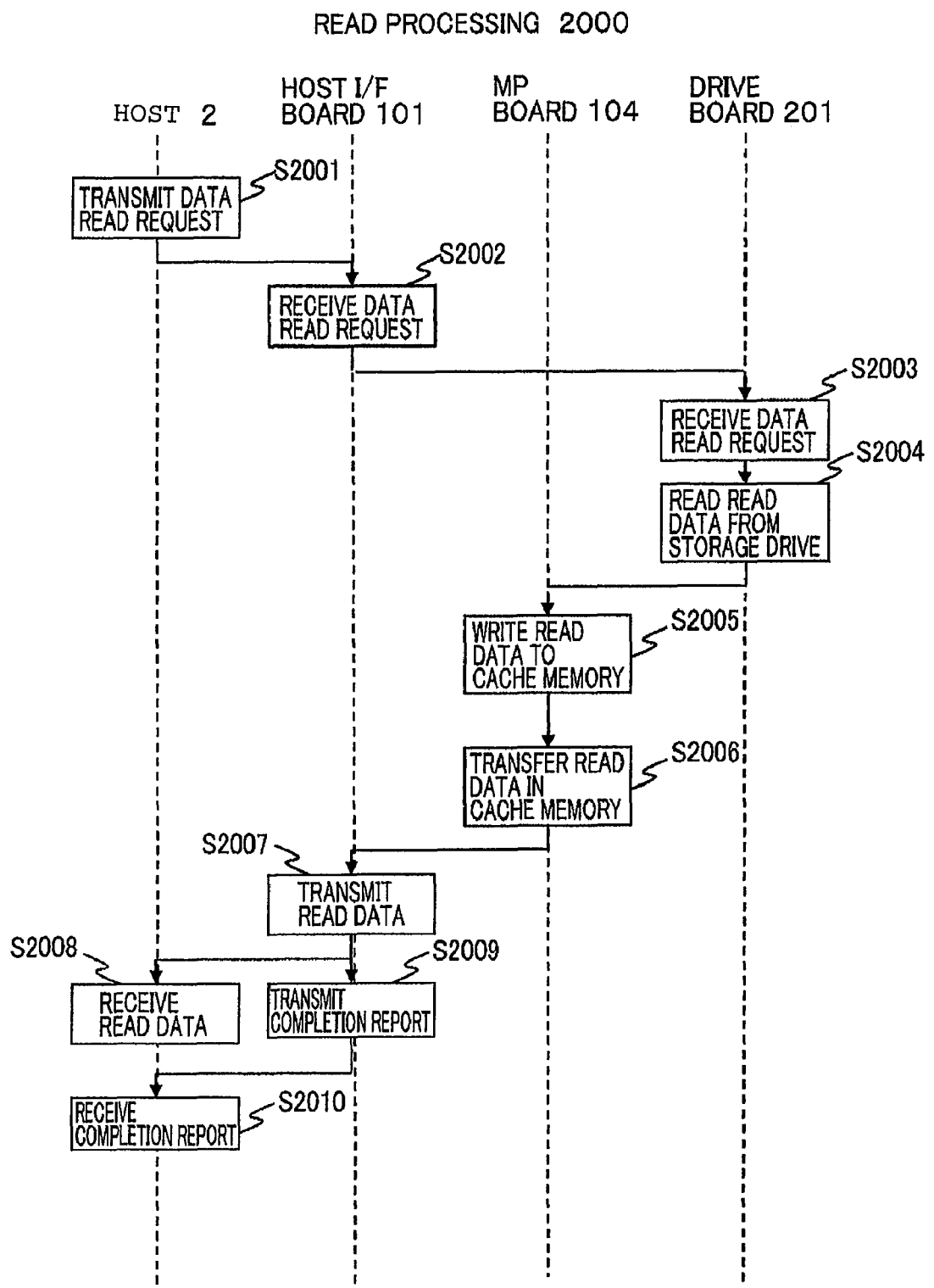
FIG. 12 is a diagram showing an exemplary data read processing flow in the storage apparatus 10.

FIG. 12 is a flowchart for explaining I/O processing (hereinafter, "data read processing 2000") that the data read processing unit 1102 of the I/O processing unit 1100 executes when the storage apparatus 10 receives a frame including a data read request from the host 2. Hereinafter, the data read processing 2000 will be described with reference to FIG. 12.

A frame sent from the host 2 is received by the host I/F board 101 of the storage apparatus 10 (S2001, S2002). Upon receipt of the frame from the host 2, the host I/F board 101 notifies the drive board 201 of the reception (S2003).

Upon receipt of the notification from the host I/F board 101, the drive board 201 reads from the storage drive 202 the data specified by the data read request included in the frame (for example, data specified with a LBA (Logical Block Address)) (S2004). When the read data is present in the memory 1033 (cache memory) of the memory board 103 (i.e., in case of a cache hit), the read processing (S2004) from the storage drive 202 is omitted. The MP board 104 writes the data read by the drive board 201 into the cache memory (S2005). The MP board 104 transfers the data written into the cache memory to the host I/F board 101 as needed (S2006).

The host I/F board 101 sequentially sends the host 2 the read data which is sent from the MP board 104 (S2007, S2008). Upon completion of the sending of the read data, the host I/F board 101 sends a completion report to the host 2 (S2009), and the host 2 receives the sent completion report (S2010).

Power Failure Detection System

Figure 13:
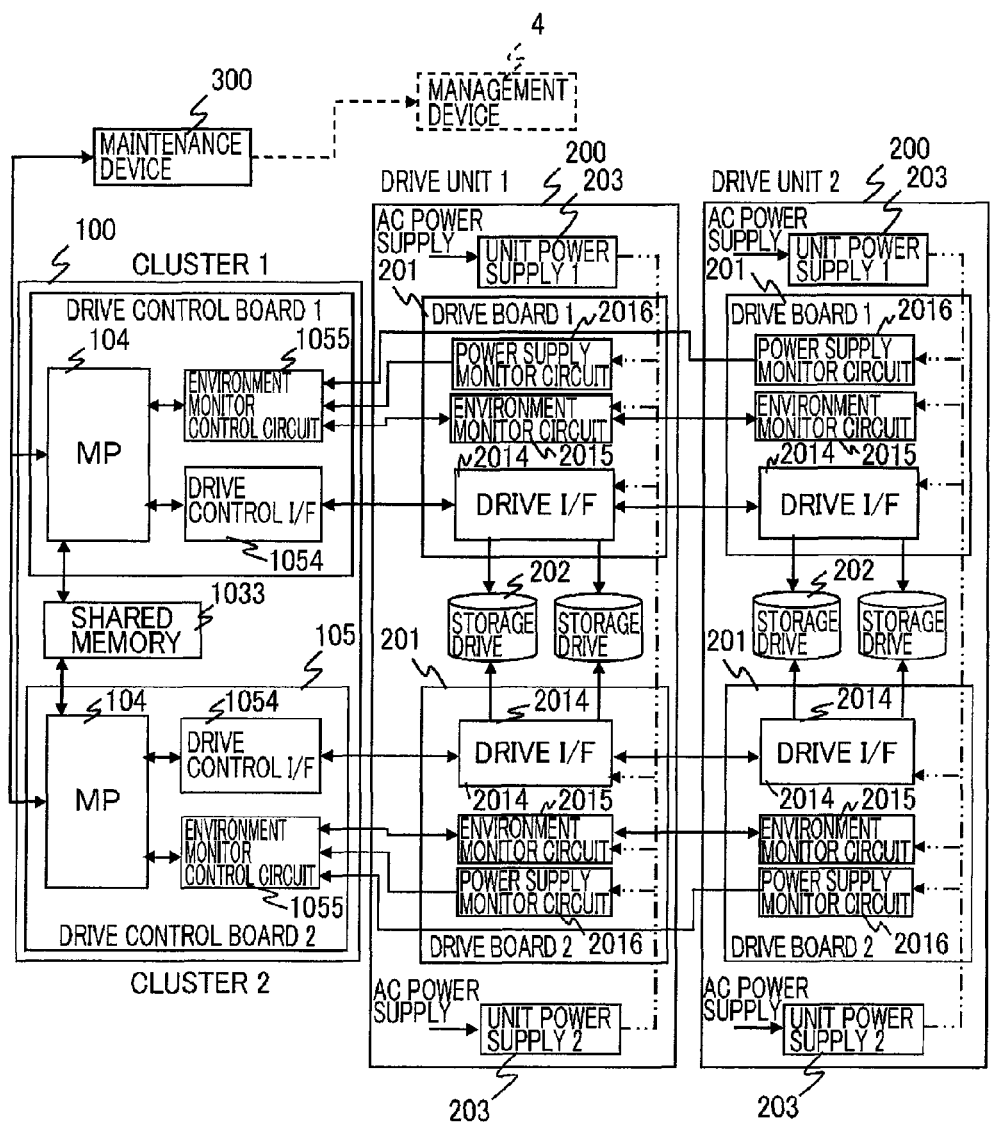
FIG. 13 is a schematic diagram showing an exemplary conventional power failure detection system.

Next, a power failure detection system implemented in the storage apparatus 10 having the foregoing configuration will be described in comparison with a typical conventional example. FIG. 13 shows an example of a conventional power failure detection system.

In the example in FIG. 13, a basic configuration as the storage apparatus 10 is similar to that of the present embodiment illustrated in FIG. 4. In the conventional power failure detection system, two MPs 104 for data I/O to and from the storage drives 202 are each provided on one of drive control boards 105. These MPs 104 are thus provided in different systems to secure the redundancy of the power supply system, and these systems are here referred to as a cluster 1 and a cluster 2 (also called "C1" and "C2," as needed). In addition, component elements belonging to the cluster 1 and the cluster 2 are discriminated from each other by being referred to as a MP 1, a MP 2, a drive unit 1, a drive unit 2 and the like, for example. Each of the MPs 104 is able to access the drive control board 105 belonging to the same cluster as the MP 104 itself, but is unable to access the drive control board 105 belonging to the other cluster. In this point, the conventional configuration in FIG. 13 is different from the configuration in the present embodiment.

The configuration in FIG. 13 shows the storage apparatus 10 in which a single controller device 100 is coupled to two drive unit devices 200. In fact, there are other possible configurations in which two or more controller devices 100 and one to three or more drive unit devices 200 may be provided in a single apparatus chassis.

The MP 104 performs the data I/O command processing on storage drives 202 and the processing for power supply monitoring and power failure detection in the drive unit devices 200 on a cluster-by-cluster basis. Both of the MP 1 and the MP 2 are able to access a shared memory (for example, the memory 1033) of the controller device 100, and are able to write and read data to be shared for use by the MP 1 and the MP 2.

Each of the drive unit devices 200 is provided with two cluster-based drive unit power supplies (hereinafter "unit power supplies") 203, which are each coupled to a different AC power supply through a switch such as a breaker. The unit power supplies 203 each include a plurality of AC/DC switching power supply devices having DC voltage outputs. The aforementioned environment monitor circuit 2015 and a power supply monitor circuit 2016 are provided on the drive board 201 in each of the drive unit devices 200. Each of the unit power supplies 203 supplies operation power to the drive boards 201 and inputs a power supply information signal to the power supply monitor circuits 2016. The power supply information signal is a signal reporting dissipation or anomalous reduction of an output voltage, or a power failure caused by any of various kinds of troubles inside the unit power supply 203.

Upon receipt of the power supply information signal, each of the power supply monitor circuits 2016 transmits the power supply information signal to the MP 104 through an environment monitor control circuit 1055. As described above, a dedicated network line is provided between the environment monitor control circuit 1055, and each of the environment monitor circuit 2015 and the power supply monitor circuit 2016, and data of the aforementioned various kinds of measurement values in addition to the power supply information signal are received and transmitted therebetween in accordance with appropriate network protocols. Since the power supply monitor circuits 2016 are provided in each of the drive unit devices 200 on the cluster-by-cluster basis, the number of signal lines from the power supply monitor circuits 2016 provided between the drive unit device 200 and the controller device 100 increases with an increase in the number of the drive unit devices 200 coupled to the controller device 100.

Figure 14:
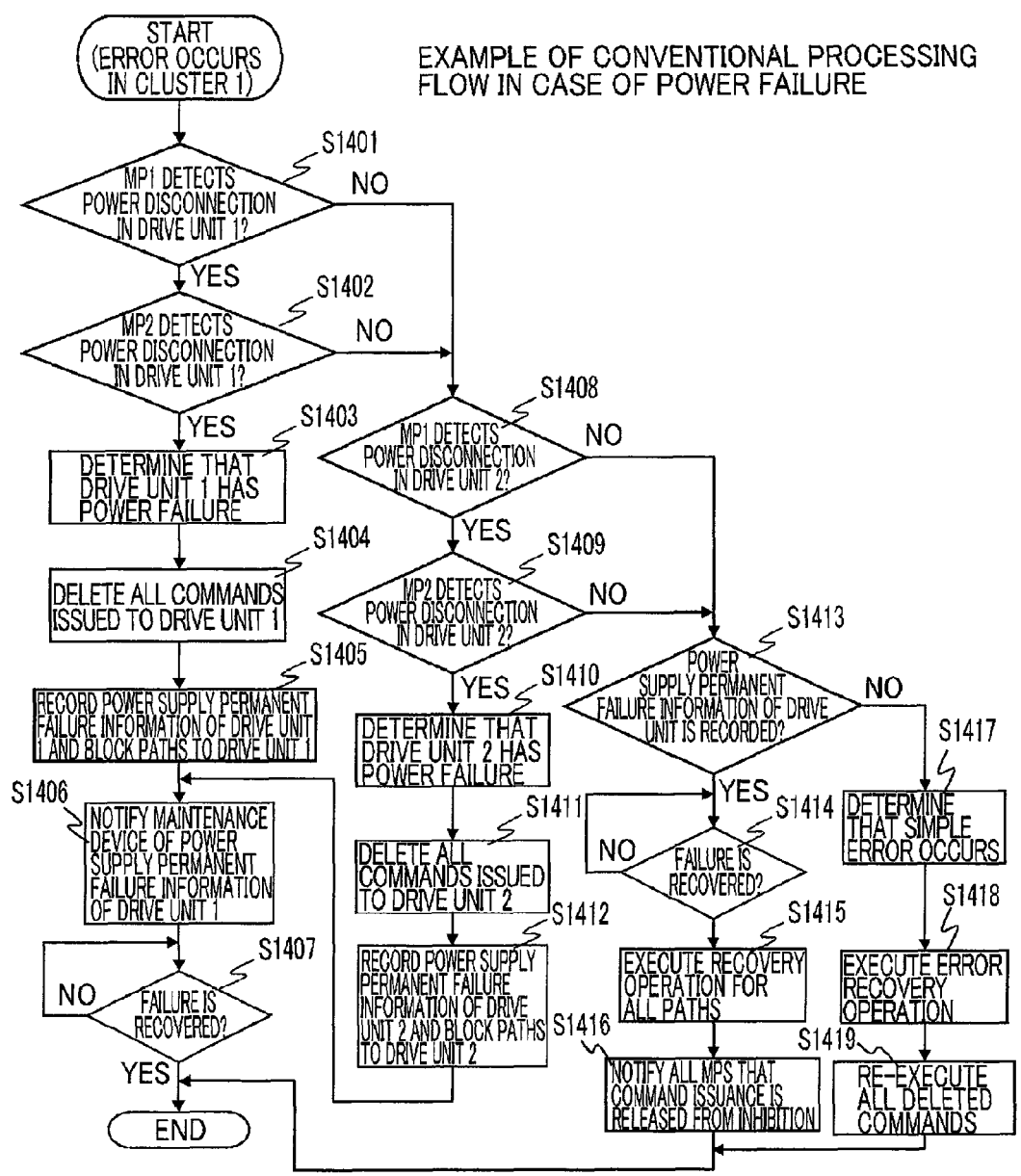
FIG. 14 is a diagram showing an example of a conventional processing flow for the case of a power failure.

Here, description will be provided for a processing flow for the case of a power failure executed in the foregoing conventional configuration. FIG. 14 shows an example of a conventional processing flow for the case of a power failure. FIG. 14 shows a flow in which, when an error occurs in a command operation in the cluster 1, the MP 1 identifies whether or not the error is caused by a power failure of one of the drive unit devices 200 or by a trouble other than the power failure, such as a trouble on the processing path for the data I/O command, and executes an appropriate recovery operation from the error.

First of all, the MP 104 (hereinafter "MP 1") belonging to the cluster 1 in the controller device 100 determines whether or not the MP1 is notified of disconnection of the power supply from the unit power supplies 203 in the first drive unit device 200 (hereinafter "drive unit 1"), through the power supply information signal by the power supply monitor circuit 2016 (S1401). When determining that the MP1 is notified (S1401: Yes), the MP 1 determines whether or not the MP 104 (hereinafter "MP 2") belonging to the cluster 2 in the controller device 100 is notified of disconnection of the power supply from the unit power supplies 203 in the drive unit 1, through the power supply information signal (S1402). When determining that the MP2 is notified (S1402: Yes), the MP 1 determines that the unit power supplies 203 in the drive unit 1 have a power failure (S1403). In summary, in this processing flow, to enhance the reliability of the power failure determination, the power failure in the drive unit 1 is determined only when both the MP 1 and the MP 2 detect the anomaly of power supply in the drive unit 1. Note that, whether or not the MP 2 detects the anomaly of the power supply of the unit power supplies 203 in the drive unit 1 is determined by making a reference as to whether or not the MP 2 writes the power anomaly information to the shared memory 1033.

Then, the MP 1 executes processing of deleting issued commands from the cache memory, the commands addressed to the logical storage areas provided by the storage drives 202 in the drive unit 1, and having no completion reports received by the MP 1 (S1404). Thereafter, the MP 1 records power supply permanent failure information of the drive unit 1 into the shared memory 1033, and blocks the data I/O paths to the drive unit 1 (S1405). The power supply permanent failure information indicates a failure in which the unit power supplies 203 have a trouble disabling power supply and cannot be restored without being replaced for maintenance.

Subsequently, the MP 1 notifies the maintenance device 300 of the power supply permanent failure information of the drive unit 1 (S1406). Based on this, the maintenance device 300 can cause the management device 4 to output a message or the like indicating that the failure has occurred in the unit power supplies 203 of the drive unit 1 and prompting for replacement of the unit power supplies 203 for maintenance.

Meanwhile, the MP 1 waits for the power failure recovery in the drive unit 1 (S1407: No), and terminates the processing when determining that the drive unit 1 is recovered (S1407: Yes).

Next, when any one of the MP 1 and the MP 2 does not detect the anomaly of power supply of the unit power supplies 203 in the drive unit 1 (S1401 or S1402: No), the MP 1 determines whether or not the MP1 is notified of disconnection of the power supply from the unit power supplies 203 in the second drive unit device 200 (hereinafter "drive unit 2"), through the power supply information signal by the power supply monitor circuit 2016 (S1408). When determining that the MP1 is notified (S1408: Yes), the MP1 determines whether or not the MP2 is notified of the anomaly of power supply of the unit power supplies 203 in the drive unit 2 through the power supply information signal (S1409). When determining that the MP2 is notified (S1409: Yes), the MP 1 determines that the unit power supplies 203 in the drive unit 2 have a power failure (S1410).

Then, the MP 1 executes the processing of deleting issued commands from the cache memory, the commands addressed to the logical storage areas provided by the storage drives 202 in the drive unit 2, and having no completion report received by the MP 1 (S1411). Thereafter, the MP 1 records the power supply permanent failure information of the drive unit 2 into the shared memory 1033, blocks the data I/O paths to the drive unit 2 (S1412), and then shifts the processing to S1406.

Next, when any one of the MP 1 and the MP 2 does not detect the anomaly of power supply from the unit power supplies 203 of the drive unit 2 (S1408 or S1409: No), the MP 1 refers to the shared memory 1033 to determine whether or not the power supply permanent failure information is recorded for any of the drive unit devices 200 (S1413). When determining that the power supply permanent failure information is recorded (S1413: Yes), the MP 1 waits for the failure recovery (S1414: No). When determining that the failure is recovered, the MP 1 executes a recovery operation (blocking release operation) for the data I/O paths to the drive unit device 200 for which the power supply permanent failure information is recorded (S1415), and records into the shared memory 1033 that an issuance of a data I/O command to the drive unit device 200 is released from inhibition. The MP 2 refers to the shared memory 1033 to acquire the information on the inhibition release (S1416).

Meanwhile, when determining that the power supply permanent failure information of any of the drive unit devices 200 is not recorded in S1413 (S1413: No), the MP 1 determines that the error occurring in the cluster 1 is not a power failure (is a simple error) (S1417), then executes an error recovery operation and re-executes all the commands which have been deleted from the cache memory in the cluster 1 (S1418, S1419).

Example 1 of Present Embodiment

Figure 15:
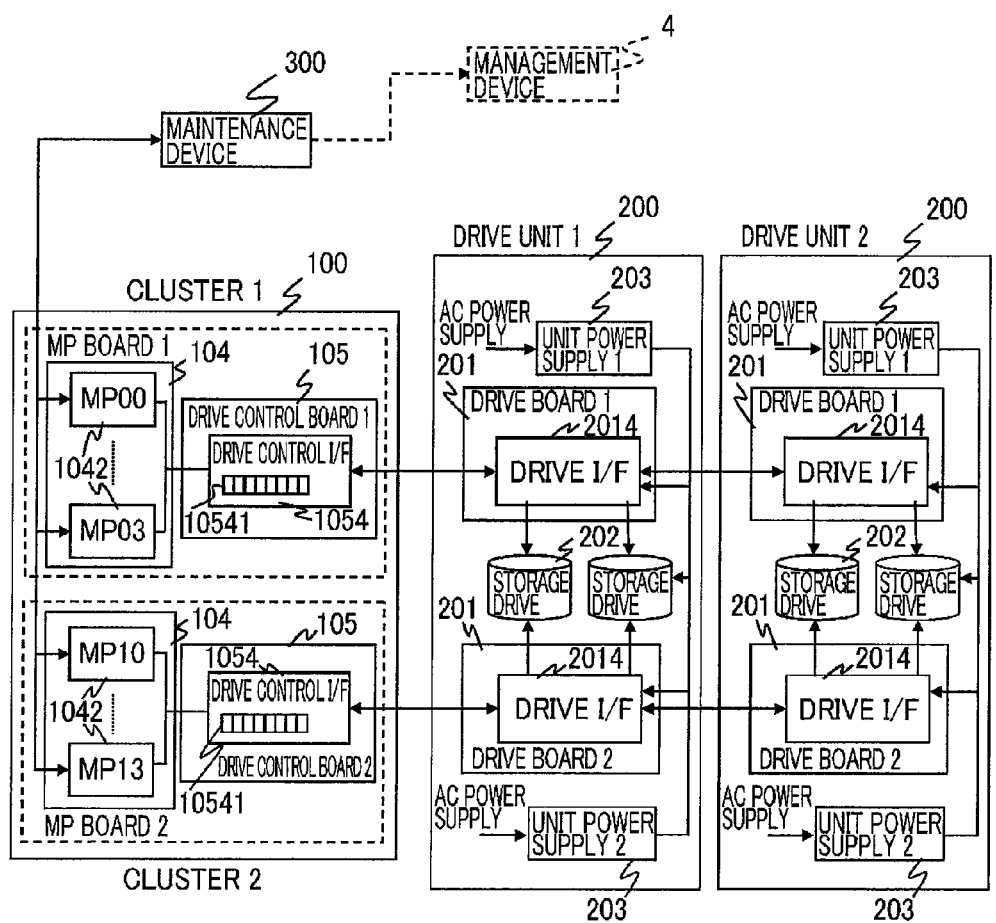
FIG. 15 is a schematic diagram showing an exemplary power failure detection system in the present embodiment.

In contrast to the above typical conventional example, FIG. 15 shows an exemplary power failure detection system related to a configuration of Example 1 of the present embodiment. Unlike the configuration example in FIG. 13, MPs 1042 in charge of data I/O to and from storage drives 202 are mounted on each MP board 104, independently. In the example in FIG. 15, a MP board 104 is provided for each power supply system in a storage apparatus 10, and it is equipped with four MPs 1042. These MPs 1042 can communicate with any of the other MPs 1042 through the switch boards 102 shown in FIG. 4. In the present embodiment, at least one of the MPs 1042 is selected as a representative MP and is in charge of the processing for power supply monitoring and power failure detection, as will be described later.

A drive control board 105 does not include a circuit equivalent to the environment monitor control circuit 1055 in FIG. 13. The power supply information signal on unit power supplies 203 is inputted to a drive I/F 2014 on a drive board 201 in a drive unit device 200 and then is received by a drive control I/F 1054 by using a network interface (Fibre Channel, SAS, SATA or the like) for data I/O performed between the drive control I/F 1054 and the drive I/F 2014.

The drive control I/F 1054 on the drive control board 105 in the controller device 100 is provided with a data queue 10541 in which data I/O commands from the MPs 1042 are sequentially stored. The data queue 10541 is stored in the shared memory set in the memory 1033 on the memory board 103, as a hardware example, and is accessible from all the MPs 1042 in the controller device 100. In the data queue 10541, the representative MP 1042 executing the processing for power supply monitoring and power failure detection also stores commands for the recovery operation from a power failure and the like.

Figure 16A:
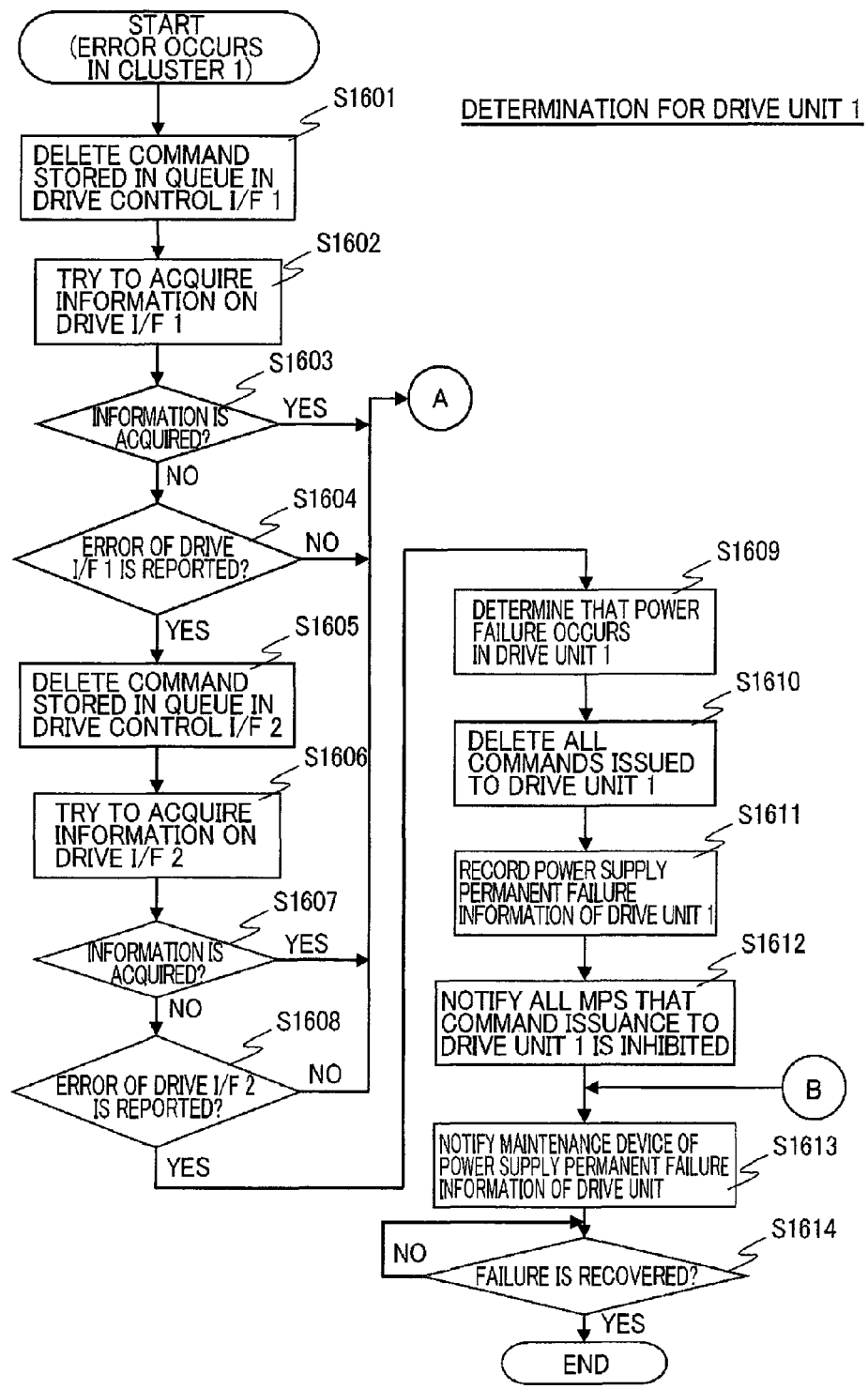
FIG. 16A is a diagram showing an exemplary processing flow for the case of a power failure in the present invention.
Figure 16B:
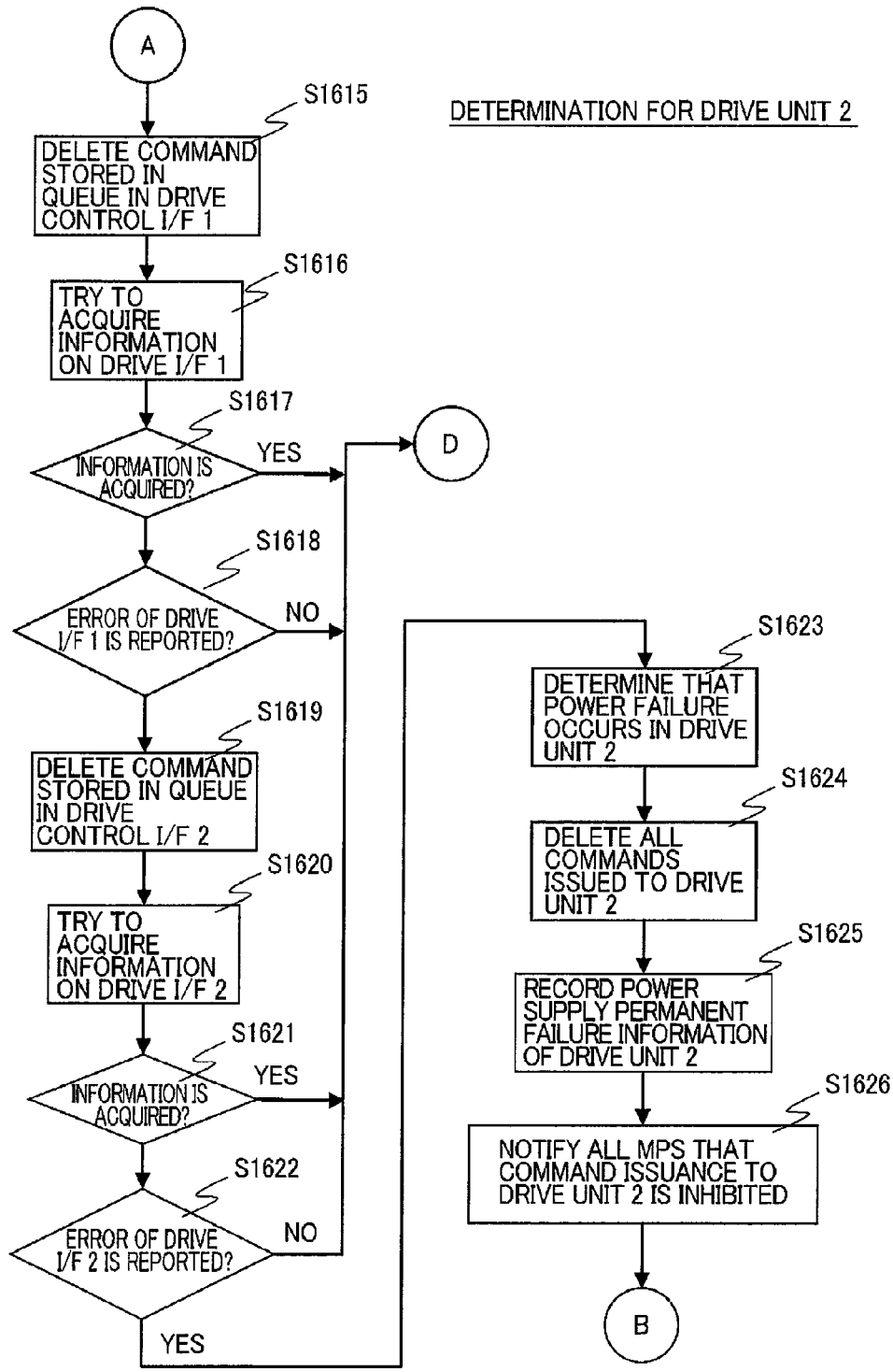
FIG. 16B is a diagram showing the exemplary processing flow for the case of a power failure in the present invention.
Figure 16C:
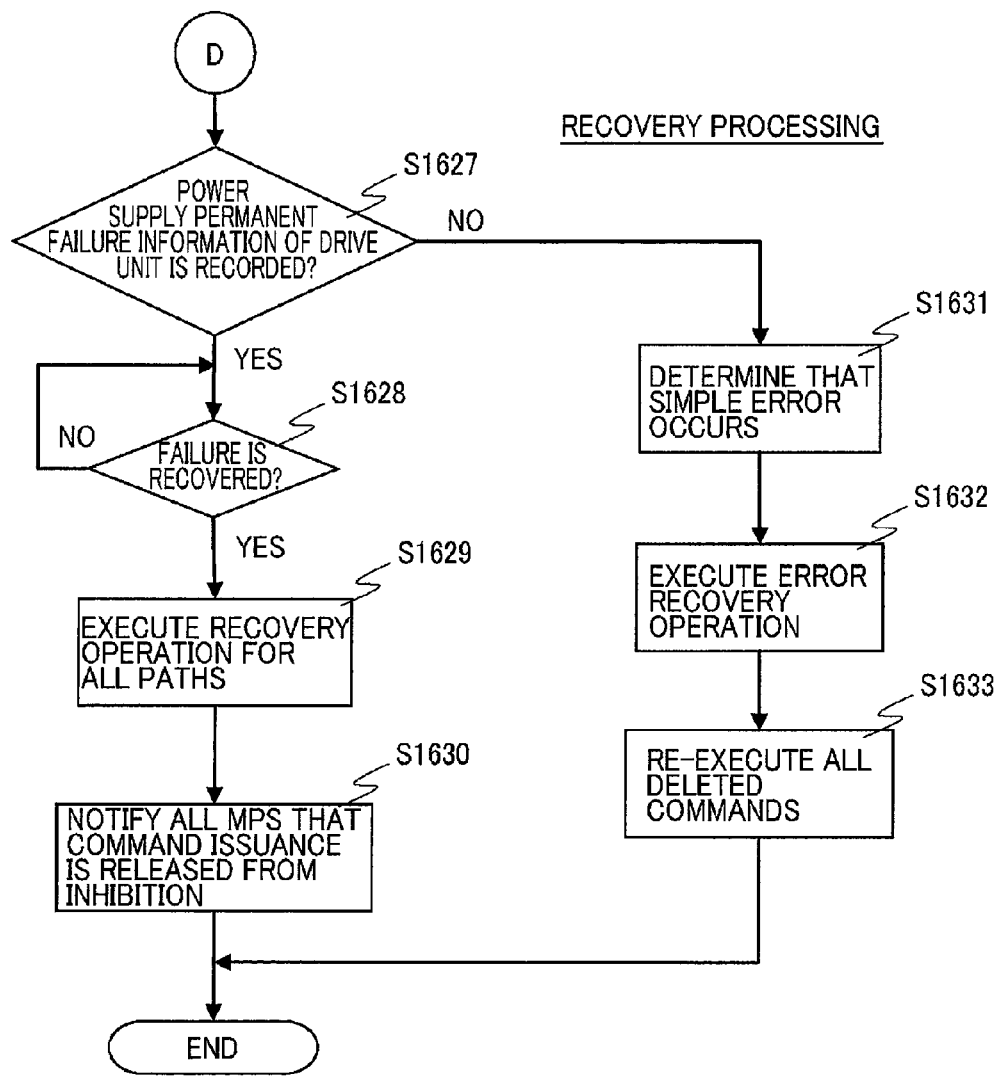
FIG. 16C is a diagram showing the exemplary processing flow for the case of a power failure in the present invention.

Here, description will be provided for a processing flow for the case of a power failure executed by the above configuration in the present embodiment. FIGS. 16A to 16C show an example of the processing flow for the case of a power failure in the present embodiment. As is the case with FIG. 14, FIGS. 16A to 16C illustrate a flow in which, when an error occurs in a command operation in the cluster 1, the MP 1 identifies whether or not the error is caused by a power failure of any of the drive unit devices 200 or by a trouble other than the power failure, such as a trouble on the processing path for a data I/O command, and executes an appropriate recovery operation from the error. This processing flow is executed by the error detecting unit 1301 in the power supply monitoring part 1300, for example.

First of all, any one of the MPs 1042 (any of a MP 00 to a MP 03 in FIG. 15, hereinafter "MP 1") belonging to the cluster 1 in the controller device 100 deletes (flushes) all the commands stored in the data queue 10541 in the drive control I/F 1054 (hereinafter "drive control I/F1") in the cluster 1 (S1601), and attempts to acquire power supply information of the unit power supplies 203 by communicating with the drive I/F 2014 (hereinafter "drive I/F1") in a first drive unit device 200 (hereinafter "drive unit 1") (S1602). When the power supply information is not acquired (S1603: No), the MP 1 determines whether or not the drive I/F1 has recorded error information to its own memory 2013 (S1604).

When determining that the error information of the drive I/F 1 is recorded (S1604: Yes), then the MP 1 deletes (flushes) all the commands stored in the data queue 10541 in the drive control I/F 1054 (hereinafter "drive control I/F 2") in the cluster 2 (S1605), and attempts to acquire power supply information of the unit power supplies 203 by communicating with the drive I/F 2014 (hereinafter "drive I/F 2") belonging to the cluster 2 in the drive unit 1 (S1606). When the power supply information is not acquired (S1607: No), the MP 1 determines whether or not the drive I/F 2 has recorded error information to its own memory 2013 (S1608).

When determining that the error information of the drive I/F 2 is recorded (S1608: Yes), the MP 1 determines that a power failure has occurred in the unit power supplies 203 of the drive unit 1 (S1609). In short, in this processing flow, to enhance the reliability of the power failure determination, the power failure in the drive unit 1 is determined only when the MP 1 receives the error information from both of the drive I/F1 and the drive I/F 2 in the drive unit 1.

Then, the MP 1 executes the processing of deleting issued commands from the cache memory, the commands addressed to the logical storage areas provided by the storage drives 202 in the drive unit 1, and having no completion report received by the MP 1 (S1610). Thereafter, the MP 1 records the power supply permanent failure information of the drive unit 1 into the shared memory 1033, and blocks the data I/O paths to the drive unit 1 (S1611).

Subsequently, the MP 1 makes a notification to the other MPs 1042 to inhibit the MPs 1042 from issuing any commands to the storage drives 202 belonging to the drive unit 1 (S1612). Then, the MP 1 notifies the maintenance device 300 of the power supply permanent failure information of the drive unit 1 (S1613). Based on this, the maintenance device 300 can cause the management device 4 to output a message or the like indicating that the failure has occurred in the unit power supplies 203 of the drive unit 1 and prompting for replacement of the unit power supplies 203 for maintenance.

Meanwhile, the MP 1 waits for the power failure recovery in the drive unit 1 (S1614: No), and terminates the processing when determining that the drive unit 1 is recovered (S1614: Yes). Note that, as described in the example of this processing flow, the MP 1 executes this processing flow every time the occurrence of an error in any of the clusters is detected. The error detection by the MP 1042 will be described in detail later. The above processing represents a processing flow for determining whether or not a power failure occurs in the drive unit 1.

Meanwhile, when the MP 1 acquires the power supply information of the unit power supplies 203 from the drive I/F1 or the drive I/F 2 (S1603 or S1607: Yes), or when the MP 1 determines that the drive I/F1 or the drive I/F 2 has not recorded the error information onto its own memory 2013 (S1604 or S1608: No), the MP 1 shifts the processing to S1615 in FIG. 16B. Hereinafter, the processing is shifted to a processing flow for determining whether or not a power failure occurs in the drive unit 2. This processing flow is the same as the processing flow for determination for the drive unit 1.

Firstly, the MP 1 deletes (flushes) all the commands stored in the data queue 10541 in the drive control I/F1 in the cluster 1 (S1615), and attempts to acquire the power supply information of the unit power supplies 203 by communicating with the drive I/F1 in the drive unit 2 (S1616). When the power supply information is not acquired (S1617: No), the MP 1 determines whether or not the drive I/F1 has recorded the error information to its own memory 2013 (S1618).

When determining that the error information of the drive I/F1 is recorded (S1618: Yes), then the MP 1 deletes (flushes) all the commands stored in the data queue 10541 in the drive control I/F 2 in the cluster 2 (S1619), and attempts to acquire the power supply information of the unit power supplies 203 by communicating with the drive I/F 2 belonging to the cluster 2 in the drive unit 2 (S1620). When the power supply information is not acquired (S1621: No), the MP 1 determines whether or not the drive I/F 2 has recorded the error information to its own memory 2013 (S1622).

When determining that the error information of the drive I/F 2 is recorded (S1622: Yes), the MP 1 determines that a power failure has occurred in the unit power supplies 203 of the drive unit 2 (S1623).

Then, the MP 1 executes the processing of deleting issued commands from the cache memory, the commands addressed to the logical storage areas provided by the storage drives 202 in the drive unit 2, and having no completion report received by the MP 1 (S1624). Thereafter, the MP 1 records the power supply permanent failure information of the drive unit 2 into the shared memory 1033, and blocks the data I/O paths to the drive unit 2 (S1625).

Subsequently, the MP 1 makes a notification to the other MPs 1042 to inhibit the MPs 1042 from issuing any commands to the storage drives 202 belonging to the drive unit 2 (S1626), and shifts the processing to S1613. The above represents a processing flow for determining whether or not a power failure occurs in the drive unit 2.

Meanwhile, when the MP 1 acquires the power supply information of the unit power supplies 203 from the drive I/F1 or the drive I/F 2 in the drive unit 2 (S1617 or S1621: Yes), or when the MP 1 determines that the drive I/F1 or the drive I/F 2 has not recorded the error information onto its own memory 2013 (S1618 or S1622: No), the MP 1 shifts the processing to S1627 in FIG. 16C.

In S1627, the MP 1 refers to the shared memory 1033 to determine whether or not the power supply permanent failure information of any of the drive unit devices 200 is recorded. When determining that the power supply permanent failure information is recorded (S1627: Yes), the MP 1 waits for the failure recovery (S1628: No). Then, when determining the failure is recovered (S1628: Yes), the MP 1 executes the recovery operation (blocking release operation) for the data I/O paths to the drive unit device 200 for which the power supply permanent failure information is recorded (S1629), and notifies the other MPs 1042 that an issuance of a data I/O command to the drive unit device 200 is released from inhibition (S1630).

Meanwhile, when determining that the power supply permanent failure information of the drive unit device 200 is not recorded in S1627 (S1627: No), the MP 1 determines that the error occurring in the cluster 1 is not a power failure (is a simple error) (S1631), then executes the error recovery operation and re-executes all the commands which have been deleted from the cache memory in the cluster 1 (S1632, S1633).

In the above configuration, the drive control board 105 in the controller device 100 includes the data queue 10541. Upon detection of an error in the command operation in the drive unit device 200, the MP 1042 firstly flushes the data queue 10541, and stores commands issued for the MP 1042 itself to execute the power failure detection processing. In this way, the commands for the power failure detection processing are always processed preferentially, and therefore the presence and the occurrence location of a power failure can be detected quickly.

In addition, the power supply information signal of the unit power supplies 203 is transmitted by the drive unit device 200 and received by the MP 1042 through the same path as the ordinary data I/O path. For this reason, each of the drive unit devices 200 does not have to be equipped with a power supply monitor circuit, or no dedicated network line for the power supply information signal needs to be provided between the controller device 100 and each of the drive unit devices 200. Therefore, higher-density packaging and further cost down for manufacturing of the storage apparatus 10 can be achieved.

Management of MP Executing Processing for Power Supply Monitoring and Power Failure Detection Next, description will be provided for management of the MP 1042 that is to execute the processing for power supply monitoring and power failure detection in the drive unit devices 200 in the storage apparatus 10. FIGS. 17 and 18 show examples of an ownership management table 1500. As has been described for the configuration of the controller device 100, in order to distribute a load of data processing among two or more MPs 1042, each of the LDEVs generated from the storage drives 202 is assigned MPs 1042 that are to execute the data processing on the LDEV.

As shown in FIG. 17, in the ownership management table 1500, MP numbers 1501 that are identification codes given to the MPs 1042, and LDEV numbers 1502 set as logical storage areas on which the MPs 1042 are to perform the data I/O processing are recorded in association with each other. In the example in FIG. 17, MP 00 to MP 13 are recorded as the MP numbers 1501 and the MP 00, for example, is designated to perform data I/O processing on LDEVs specified by the LDEV numbers 01, 02, as having been described for FIG. 15. For each MP 1042, 1 is recorded in a cell of the LDEV number 1502 to be taken care of by the MP 1042. In reference to the ownership management table 1500, each of the MPs 1042 discriminates data I/O to be processed by itself.

In the present embodiment, in order to prevent the task for the processing for power supply monitoring and power failure detection from adversely affecting the ordinary data I/O processing by many of the MPs 1042, the MP 1042 that is to execute the processing for power supply monitoring and power failure detection is recorded in advance as a representative MP 1503 in the ownership management table 1500. In addition, a redundant representative MP 1504 (backup processing unit) is also recorded in advance in the ownership management table 1500. The redundant representative MP 1054 functions as the representative MP that executes the processing for power supply monitoring and power failure detection immediately after a failure occurs in the representative MP 1503 recorded in advance. In the example in FIG. 17, the MP 00 is the representative MP 1503 and the MP 01 is the redundant representative MP 1504. In the example in FIG. 17, one representative MP 1503 and one redundant representative MP 1504 to get involved in the processing for power supply monitoring and power failure detection are selected for the entire storage apparatus 10. In the column of a management MP 1505, the same code "A" is recorded in association with all the MP numbers 1501 since all the MPs 1042 included in the storage apparatus 10 are to be managed by the representative MP 1503.

Next, the example in FIG. 18 will be explained. In the ownership management table 1500 shown in FIG. 18, the representative MP 1503 and the redundant representative MP 1504 are selected for each cluster in the configuration in FIG. 15. In FIG. 18, codes C1, C2 represent the cluster 1, the cluster 2, respectively. In this configuration, in reference to the column of the management MP 1505, the representative MP 1503 of each cluster recognizes the MPs 1042 to be managed when the representative MP 1503 itself performs the processing for power supply monitoring and power failure detection. In the example in FIG. 18, the MP 00 as the representative MP 1503 manages the MP 01 to the MP 03 that are the other MPs 1042 in the cluster 1 to which the MP 00 belongs.

Note that, although a particular MP 1042 is predetermined as the representative MP 1503 in the present embodiment, it is also possible to employ another configuration in which an amount of data I/O processing and the like of each of the MPs 1042 is monitored, and in which the ownership management table 1500 is updated by the maintenance device 300, for example, so that a MP 1042 having less processing load placed thereon can be newly assigned to the representative MP 1503.

Figure 19:
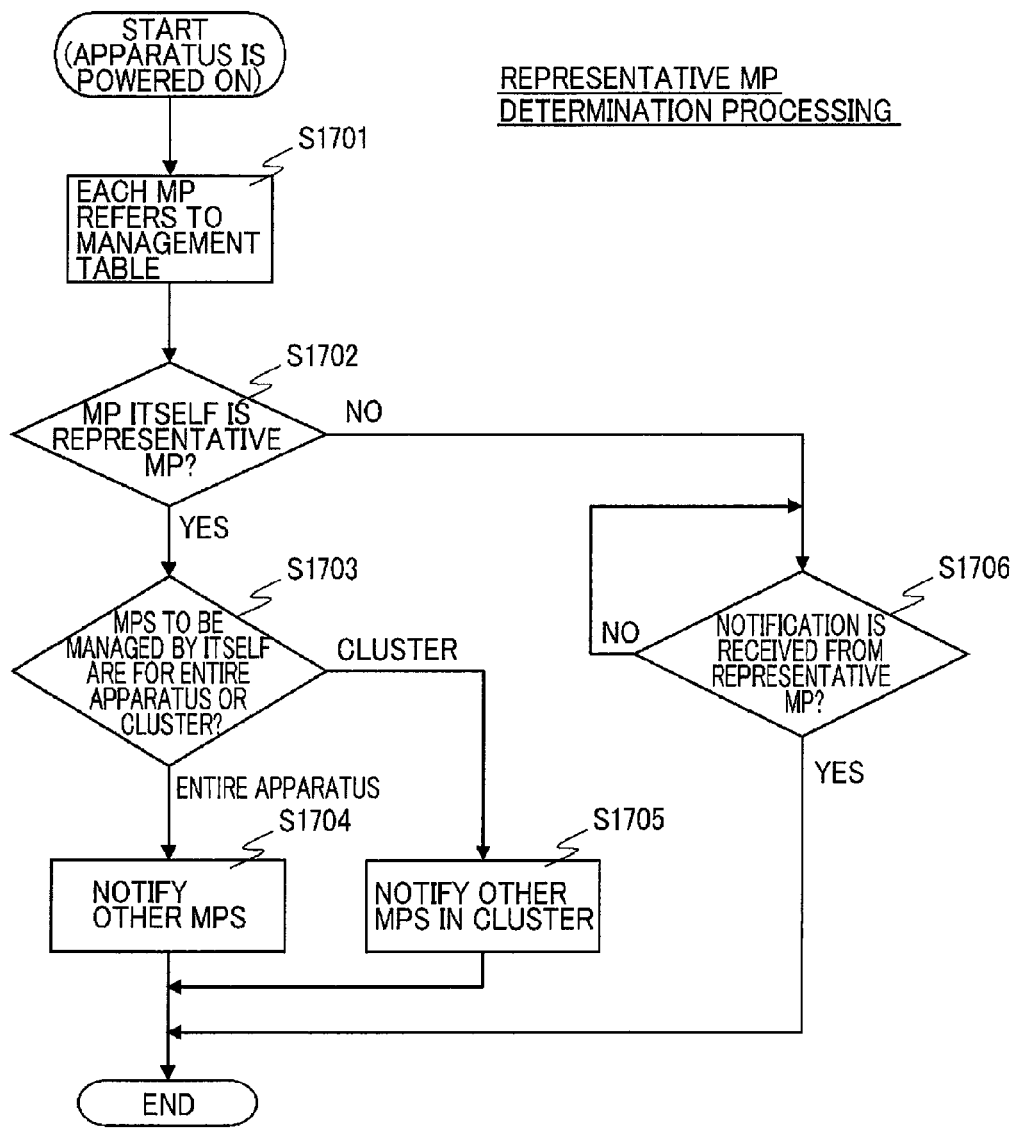
FIG. 19 is a diagram showing an exemplary processing flow for determining a representative MP in the present embodiment.

Subsequently, description will be provided for processing of determining the representative MP 1503 described in connection with the ownership management table 1500. FIG. 19 shows an example of a processing flow for determining the representative MP 1503. This processing of determining the representative MP 1503 is executed upon powering-on of the storage apparatus 10. This processing flow is executed by, for example, the power supply monitoring MP management unit 1302 in the power supply monitoring unit 1300.

First of all, each of the MPs 1042 included in the controller device 100 in the storage apparatus 10 accesses the shared memory in the memory 1033 on the memory board 103 and refers to the ownership management table 1500 stored in the shared memory (S1701). Then, each of the MPs 1042 determines whether or not the MP 1042 itself is set as the representative MP 1503 (S1702). When determining that the MP 1042 itself is the representative MP 1503 (S1702: Yes), the MP 1042 further determines whether or not the MP 1042 as the representative MP 1503 should manage the MPs 1042 in the entire apparatus 10 or the cluster to which the MP 1042 itself belongs (S1703).

When determining that the MP 1042 as the representative MP 1503 should manage the MPs 1042 in the entire apparatus 10 (S1703: entire apparatus), the MP 1042 as the representative MP 1503 notifies all the other MPs 1042 in the apparatus 10 that the MP 1042 itself is the representative MP 1503, and terminates the processing (S1704). When determining that the MP 1042 as the representative MP 1503 should manage the MPs 1042 in the same cluster as the MP 1042 itself (S1703: cluster), the MP 1042 as the representative MP 1503 notifies the other MPs 1042 in the same cluster that the MP 1042 itself is the representative MP 1503, and terminates the processing (S1705). The representative MP 1503 refers to the column of the management MP 1505 in the ownership management table 1500 in FIG. 17 or FIG. 18, and thereby checks a range of the MPs 1042 to be managed by the MP 1042 itself.

With the above configuration, the representative MP 1503 selected for the entire apparatus 10 or each cluster executes the processing for power supply monitoring and power failure detection, and therefore there is no risk of lowering the efficiency of the data I/O processing of the other MPs 1042.

Figure 20A:
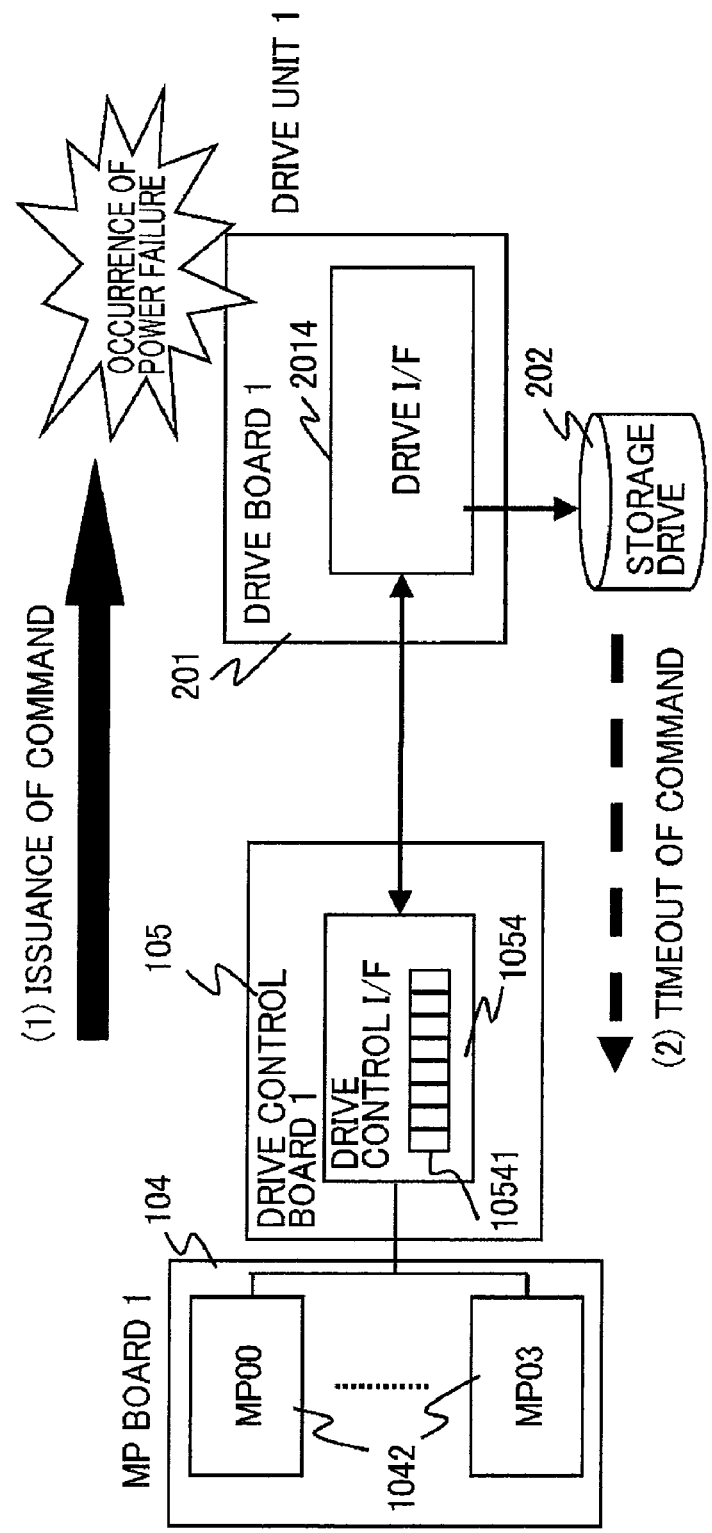
FIG. 20A is a schematic diagram illustrating a state where a power failure occurs.
Figure 20B:
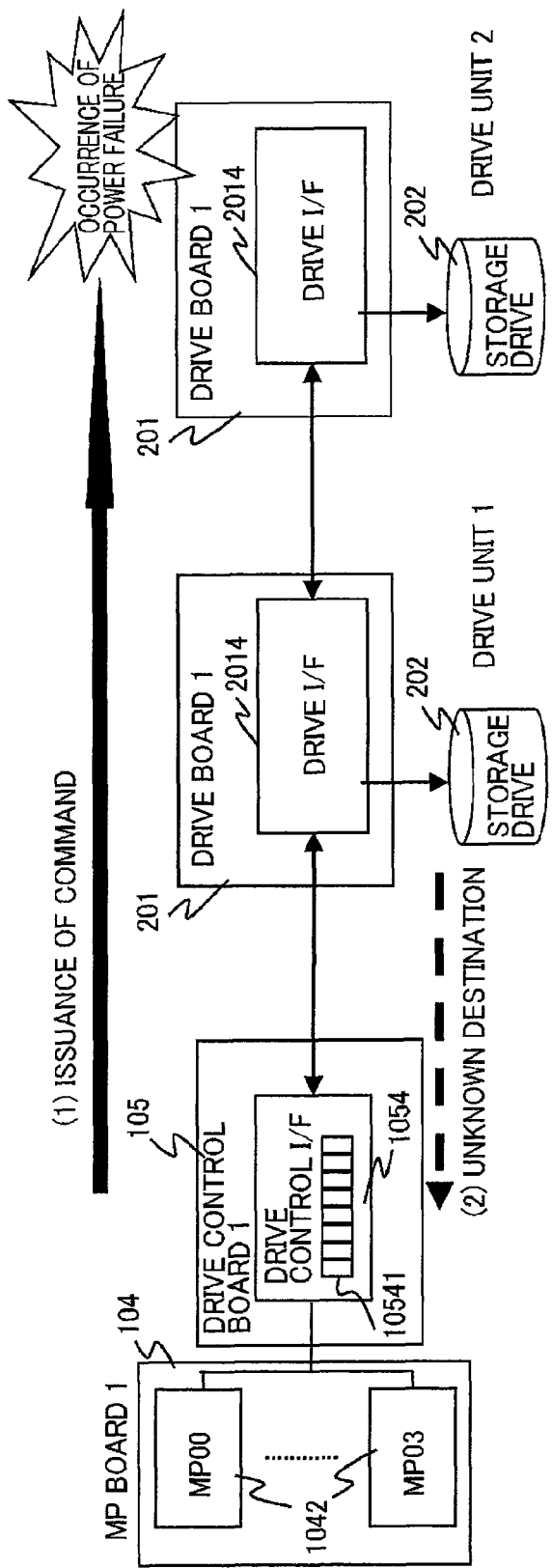
FIG. 20B is a schematic diagram illustrating a state where a power failure occurs.

Next, description will be provided for error detection by the MP 1042 that triggers the execution of the processing for power failure described with reference to FIGS. 16A to 16C. FIGS. 20A and 20B schematically show mechanisms for detecting a power failure. Each of FIGS. 20A and 20B shows related elements in one of the clusters taken out of the power failure detection system in FIG. 15.

The example in FIG. 20A shows a state where a power failure occurs in the drive unit device 200 (drive unit 1) coupled to the drive control board 105 in the controller device 100. In this case, even if one of the MPs 1042 issues a command to the drive unit 1, the drive I/F 2014 in the drive unit 1 cannot process the command, and thus the processing completion report of the command is not transmitted to the MP 1042 of the command issuer. For this reason, upon lapse of a predetermined time period after the issuance of the command, the MP 1042 of the command issuer determines that a command timeout for the command occurs, and thereby determines that a power failure occurs in the drive unit 1.

The example in FIG. 20B shows a state where a power failure occurs in the drive unit 2 that is the drive unit device 200 coupled to the drive unit 1. In the case of FIG. 20B, a command issued to the drive unit 2 by one of the MPs 1042 is transmitted to the drive unit 2 via the drive I/F 2014 in the drive unit 1. Since the power failure occurs in the drive unit 2, the drive I/F 2014 in the drive unit 1 cannot find the destination (address) in the drive unit 2 which is written in the command received from the MP 1042. In this case, the drive I/F 2014 in the drive unit 1 sends the issuer MP 1042 information indicating that the received command is addressed to "an unknown destination" as a reply to the received command. Upon receipt of this information, the issuer MP 1042 determines that the power failure occurs in the drive unit 2 to which the command is addressed. This mechanism for detecting a power failure is also applied to a case where more drive unit devices 200 are installed in cascade connection in which the drive unit 2 is coupled to a drive unit 3 coupled to a drive unit 4, and so on.

Next, the foregoing command error detection processing will be described based on an exemplary processing flow shown in FIG. 21. This processing flow is executed by, for example, the error detecting unit 1301 in the power supply monitoring unit 1300. Firstly, the MP 1042 as a command issuance requester transmits a command issuance request to the drive control I/F 1054 in the controller device 100 (S1801). Then, the MP 1042 determines whether or not a reply indicating that the command issued by the request is addressed to an unknown destination is received from the drive control I/F 1054 in the controller device 100 (S1802). When determining that the reply is received (S1802: Yes), the MP 1042 determines that the power failure occurs in the drive unit device 200 to which the command is addressed, before the drive control I/F 1054 in the controller device 100 issues the command (S1805).

On the other hand, when determining that the reply indicating that the command issued by the request is addressed to an unknown destination is not received from the drive control I/F 1054 in the controller device 100 (S1802: No), the MP 1042 as the command issuance requester determines whether or not a timeout is detected for the command issued by the drive control I/F 1054 in the controller device 100 in response to the request (S1803). When determining that the timeout is detected (S1803: Yes), the MP 1042 determines that a power failure occurs in the drive unit after the drive control I/F 1054 in the controller device 100 issues the command (S1806).

When the MP 1042 determines that the timeout for the issued command is not detected (S1803: No), the MP 1042 determines that the command requested to be issued is processed normally, i.e., no power failure occurs in the drive unit devices 200, and terminates the processing (S1804).

In the above configuration, execution of the processing for power failure is started upon occurrence of a power failure in any of the drive unit devices 200, and the occurrence and even the location of the power failure can be detected surely at appropriate timing.

Figure 21:
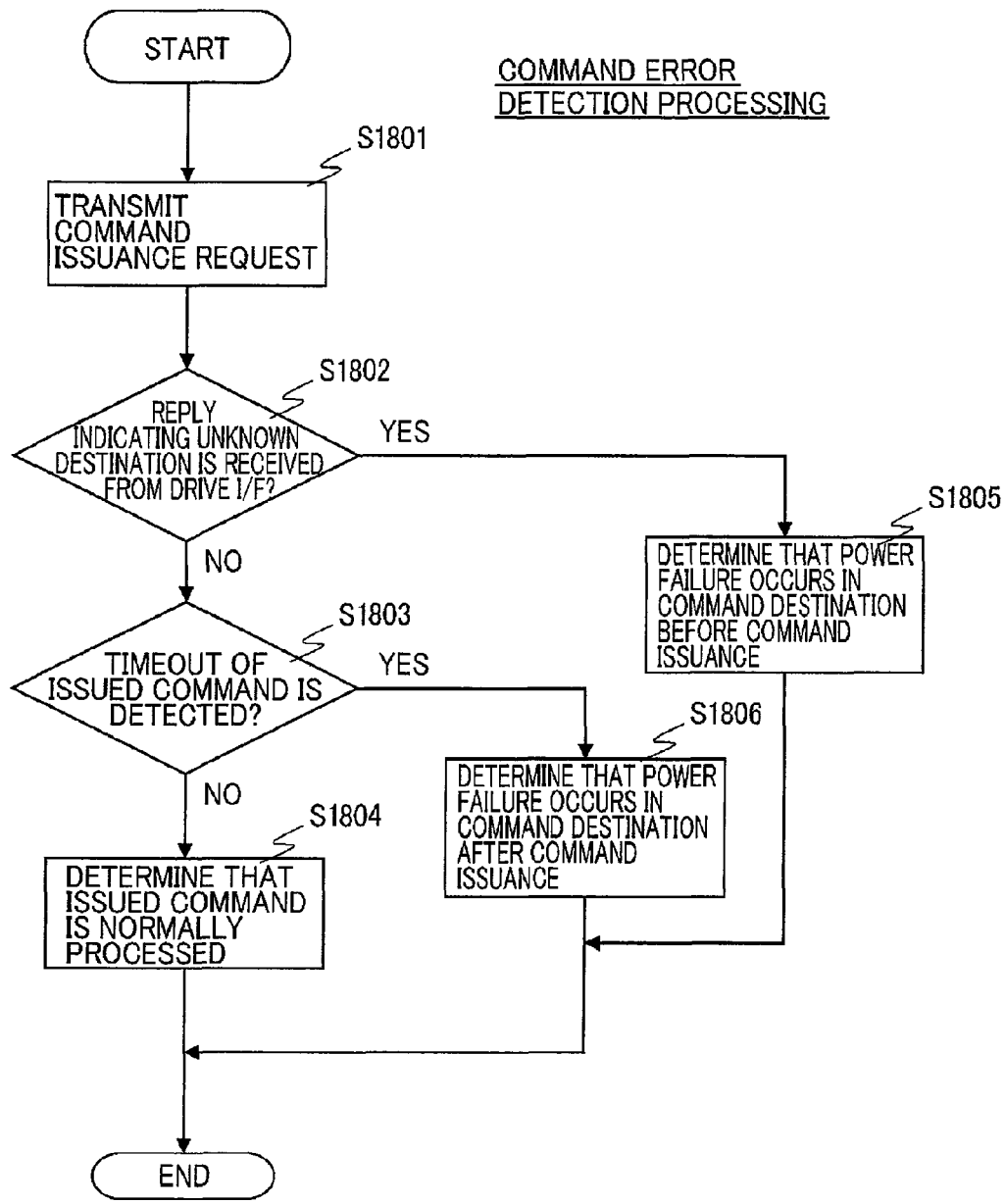
FIG. 21 is a diagram showing an exemplary processing flow for detecting an error in the present embodiment.
Figure 22:
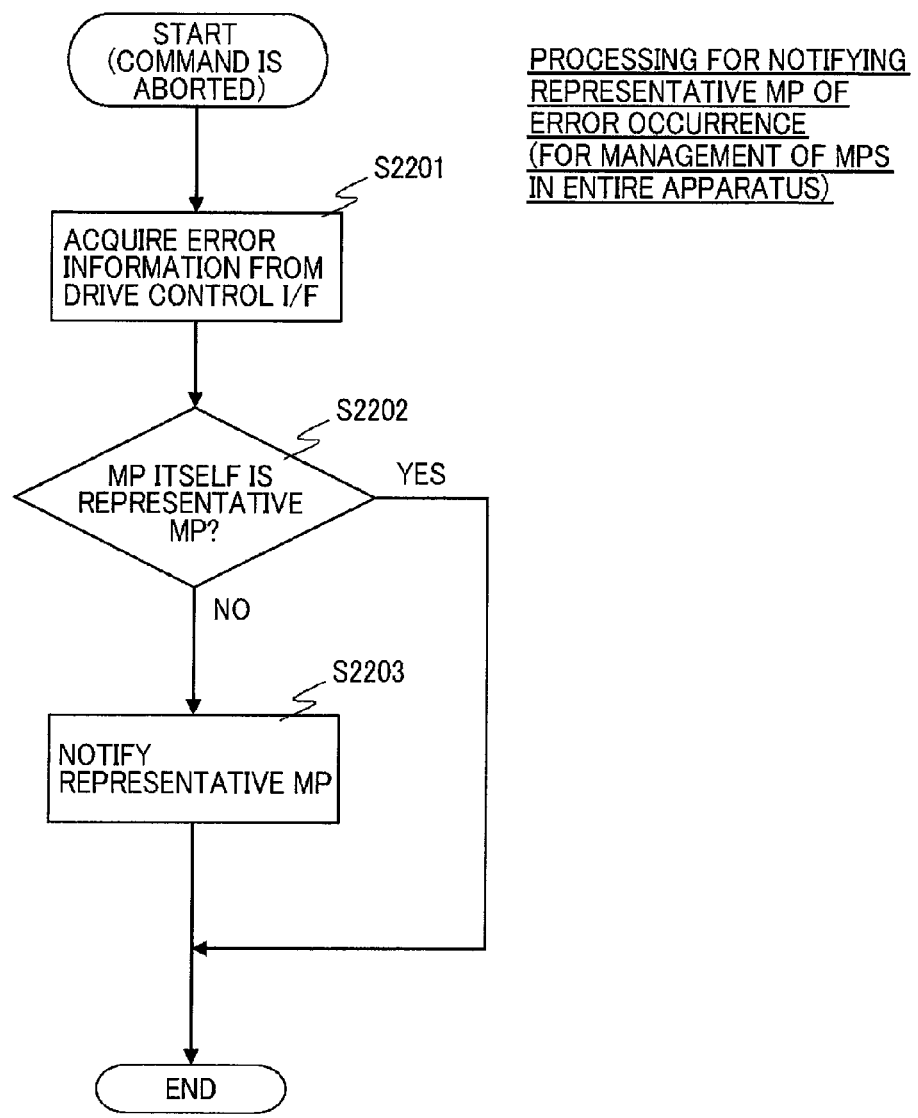
FIG. 22 is a diagram showing an exemplary processing flow for the case of a command is aborted.
Figure 23:
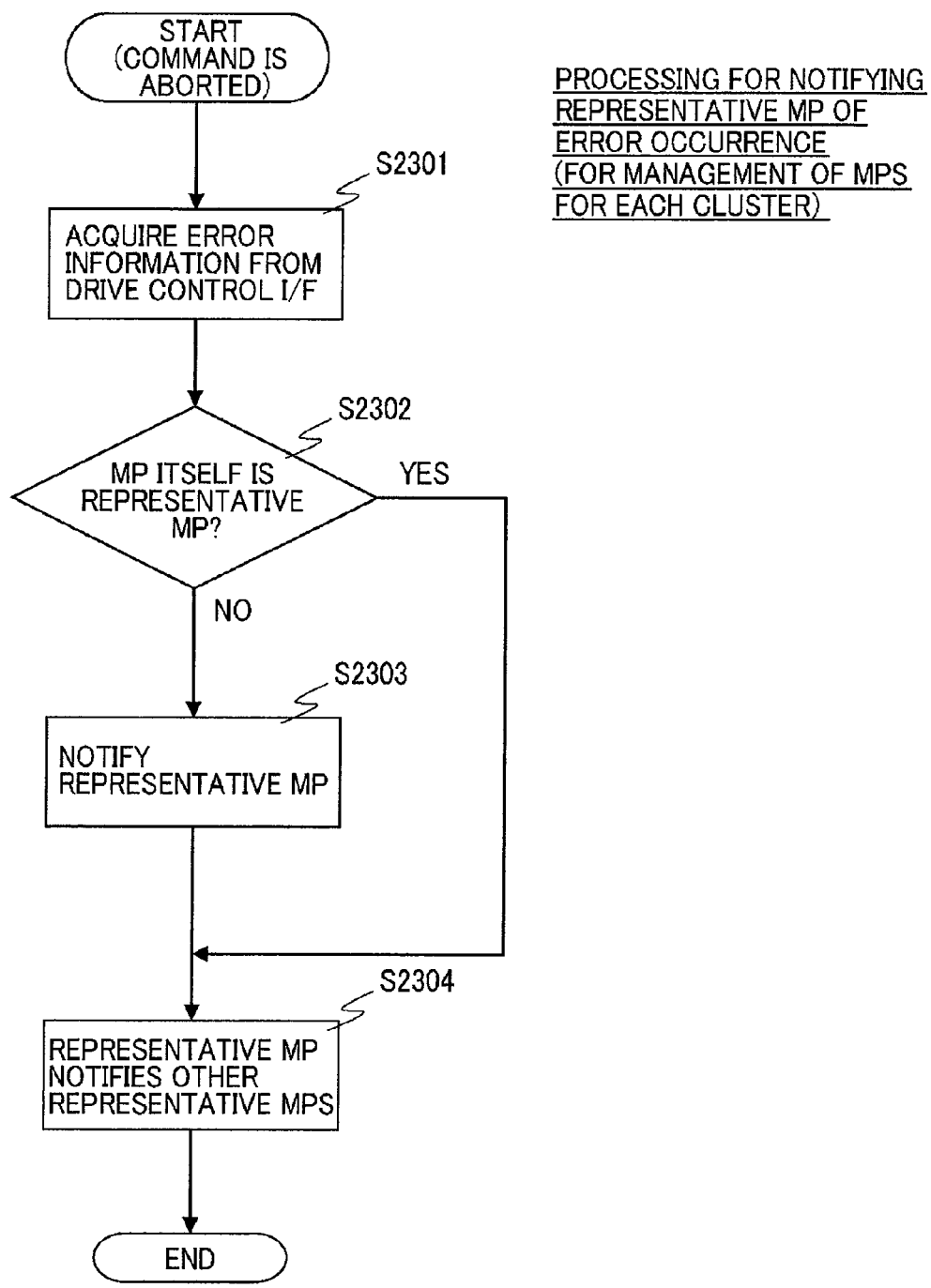
FIG. 23 is a diagram showing an exemplary processing flow for the case of a command is aborted.

Then, description will be provided for processing in which the MP 1042 that detects that a power failure occurs in the drive unit device 200 in FIG. 21 notifies the representative MP 1503 of the occurrence of the power failure. FIGS. 22 and 23 show exemplary processing flows in which the MP 1042 detecting an error notifies the representative MP 1503 of the occurrence of the error. The example in FIG. 22 shows a case where one representative MP 1503 is operating for the entire storage apparatus 10, and the example in FIG. 23 shows a case where one representative MP 1503 is operating for each cluster in the storage apparatus 10. These processing flows are executed by, for example, the error detecting unit 1301 in the power supply monitoring unit 1300.

In FIG. 22, the MP 1042 acquires error information from the drive control I/F 1054 in the controller device 100 (S2201), and determines whether or not the MP 1042 itself is the representative MP 1503 in reference to the ownership management table 1500 in FIG. 17 (S2202). When determining that the MP 1042 itself is the representative MP 1503 (S2202: Yes), the MP 1042 terminates the processing because there is no need to notify the other MPs 1042 of the occurrence of an error.

On the other hand, when determining that the MP 1042 itself is not the representative MP 1503 (S2202: No), the MP 1042 notifies the occurrence of the error to the MP 1042 set as the representative MP 1503 in the ownership management table 1500 (S2203).

FIG. 23 shows the case where the representative MP 1503 is selected for each cluster as described above, and the table illustrated in FIG. 18 is used as the ownership management table 1500. In the processing flow in FIG. 23, the flow from S2301 to S2303 is the same as the flow from S2201 to S2203 in FIG. 21. When the representative MP 1503 is selected for each cluster, the representative MP 1503 managing one of the clusters needs to be notified of the occurrence of an error, and thereafter the other representative MPs 1503 that manage the other clusters also need to be notified of the occurrence of the error. In the exemplary processing flow in FIG. 23, after one of the representative MPs 1503 detects the occurrence of an error, or is notified of the occurrence of the error, the representative MP 1503 notifies the occurrence of the error to the other representative MPs 1503 managing the other clusters in reference to the ownership management table 1500 in FIG. 18 (S2304), and then terminates the processing.

In the foregoing configuration, all the representative MPs 1503 included in the storage apparatus 10 and executing the processing for power supply monitoring and power failure detection can be notified of the occurrence of an error in any of the drive unit devices 200, and thus can be made to start the processing for power failure.

Next, processing after power failure recovery will be described. As has been described for the processing flow for the case of a power failure in FIGS. 16A to 16C, the representative MP 1503 detecting the occurrence of an error in the drive unit device 200 deletes all commands stored in the data queue 10541 in the drive control I/F 1054 in order to preferentially process commands for dealing with the power failure. Therefore, all the commands thus deleted need to be re-executed after the power failure recovery.

Figure 24:
FIG. 24 is a diagram showing an example of a command issuing MP correspondence table 1600.

FIG. 24 shows an example of a command issuing MP correspondence table used to re-execute these deleted commands. The command issuing MP correspondence table 1600 is stored in the drive control I/F 1054 of the controller device 100 in such a way that a MP number 1601 given to each of the MPs 1042 which is a command issuance requester of a command addressed to the drive I/F 2014, and a command number 1602 identifying the command requested to be issued by the MP 1042 are stored in association with each other. After the power failure recovery, the representative MP 1503 refers to this command issuing MP correspondence table 1600 to request each MP 1042, which is a requester of a command deleted from the data queue 10541 by the representative MP 1503, to issue the command again.

Figure 25:
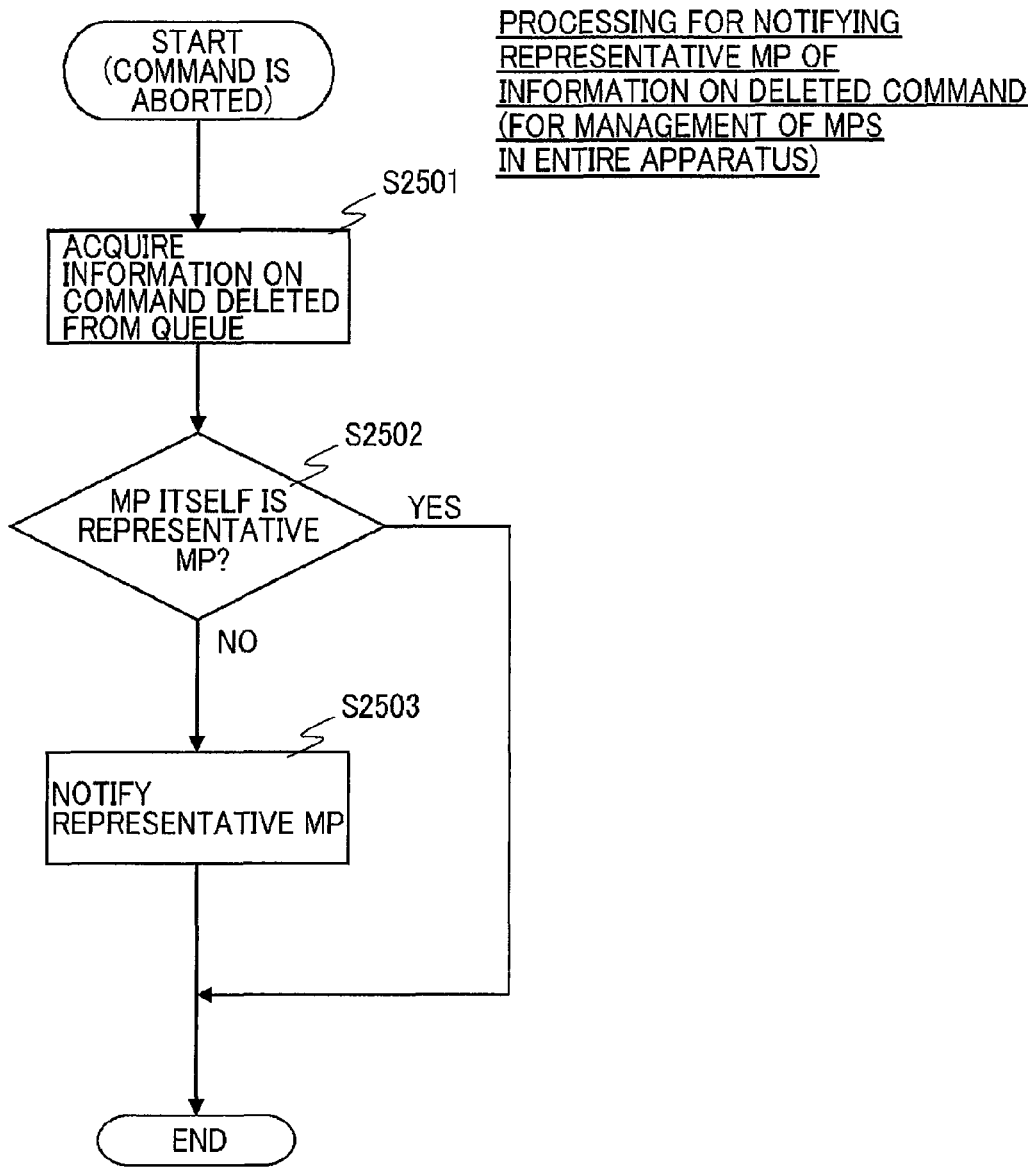
FIG. 25 is a diagram showing an exemplary processing flow for notifying a representative MP of information on a command deleted due to a failure.
Figure 26:
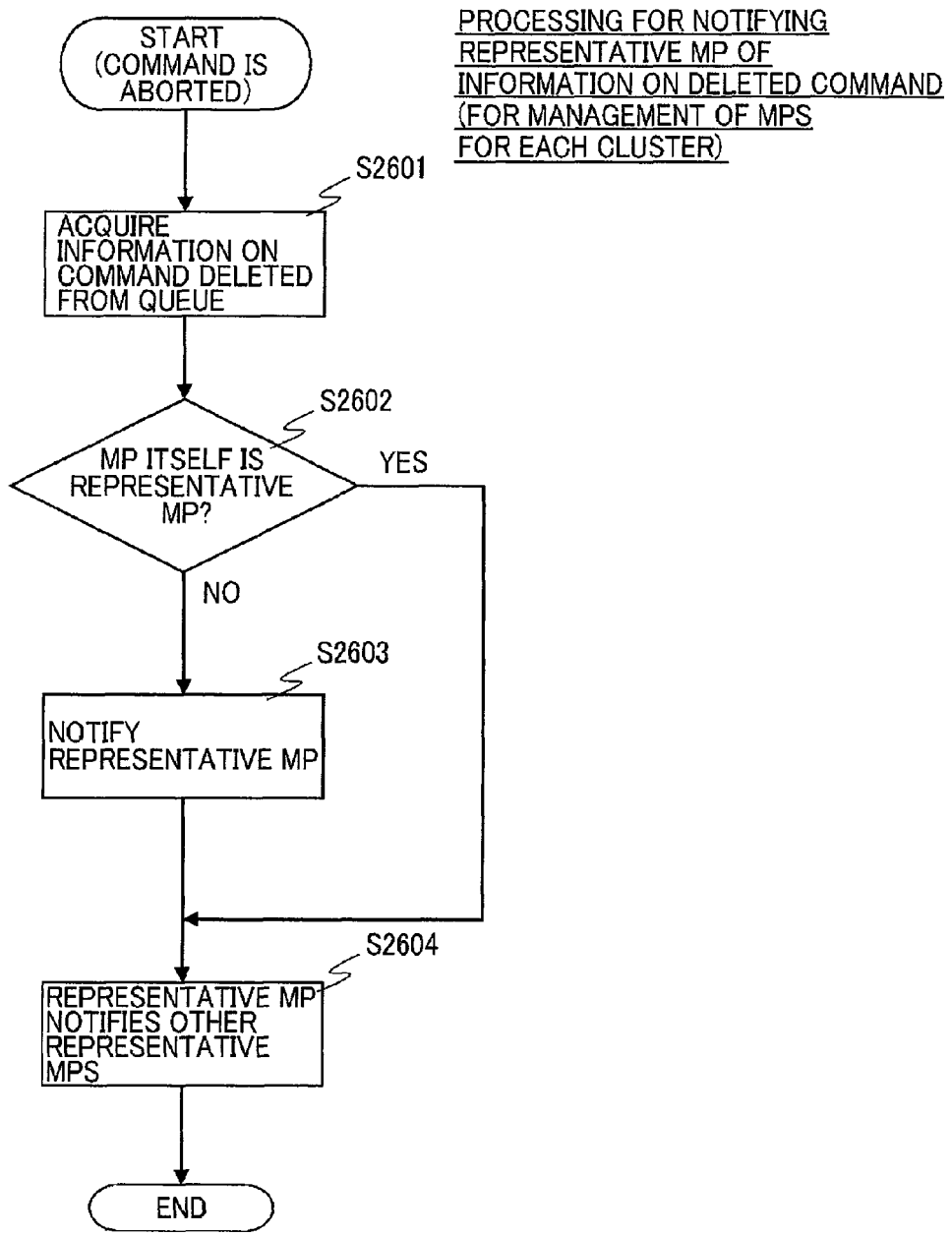
FIG. 26 is a diagram showing an exemplary processing flow for notifying a representative MP of information on a command deleted due to a failure.

FIGS. 25 and 26 show exemplary processing flows in which the MP 1042 having detected an error notifies the representative MP 1503 of information on each of the MPs 1042 which is a requester of a command deleted from the data queue 10541. The example in FIG. 25 shows the case where one representative MP 1503 is operating for the entire storage apparatus 10, and the example in FIG. 26 shows the case where one representative MP 1503 is operating for each cluster in the storage apparatus 10. These processing flows are executed by, for example, the power supply monitoring MP management unit 1302 in the power supply monitoring unit 1300.

In FIG. 25, the MP 1042 refers to the command issuing MP correspondence table 1600 to acquire information on each command issuance requester MP 1042 of a command deleted from the data queue 10541 in the drive control I/F 1054

(S2501), and then determines whether or not the MP 1042 itself is the representative MP 1503 in reference to the ownership management table 1500 in FIG. 17 (S2502). When determining that the MP 1042 itself is the representative MP 1503 (S2502: Yes), the MP 1042 terminates the processing because there is no need to notify another MP 1042 of the information on the command issuance requester MP 1042.

On the other hand, when determining that the MP 1042 itself is not the representative MP 1503 (S2502: No), the MP 1042 notifies the information on the command issuance requester MP 1042 to the MP 1042 set as the representative MP 1503 in the ownership management table 1500 (S2503).

FIG. 26 shows the case where one representative MP 1503 is selected for each cluster as described above, and the table illustrated in FIG. 18 is used as the ownership management table 1500. In the processing flow in FIG. 26, the flow from S2601 to S2603 is the same as the flow from S2501 to S2503 in FIG. 25. When the representative MP 1503 is selected for each cluster, the other representative MPs 1503 that manage the other clusters also need to be notified of the information on the command issuance requester MP 1042. In the exemplary processing flow in FIG. 26, after one of the representative MPs 1503 is notified of the information on the command issuance requester MP 1042, the representative MP 1503 notifies the other representative MPs 1503 managing the other clusters of the same information by referring to the ownership management table 1500 in FIG. 18 (S2604).

In the foregoing configuration, the commands deleted from the data queue 10541 due to the occurrence of a failure can be surely executed after the failure recovery.

Figure 27:
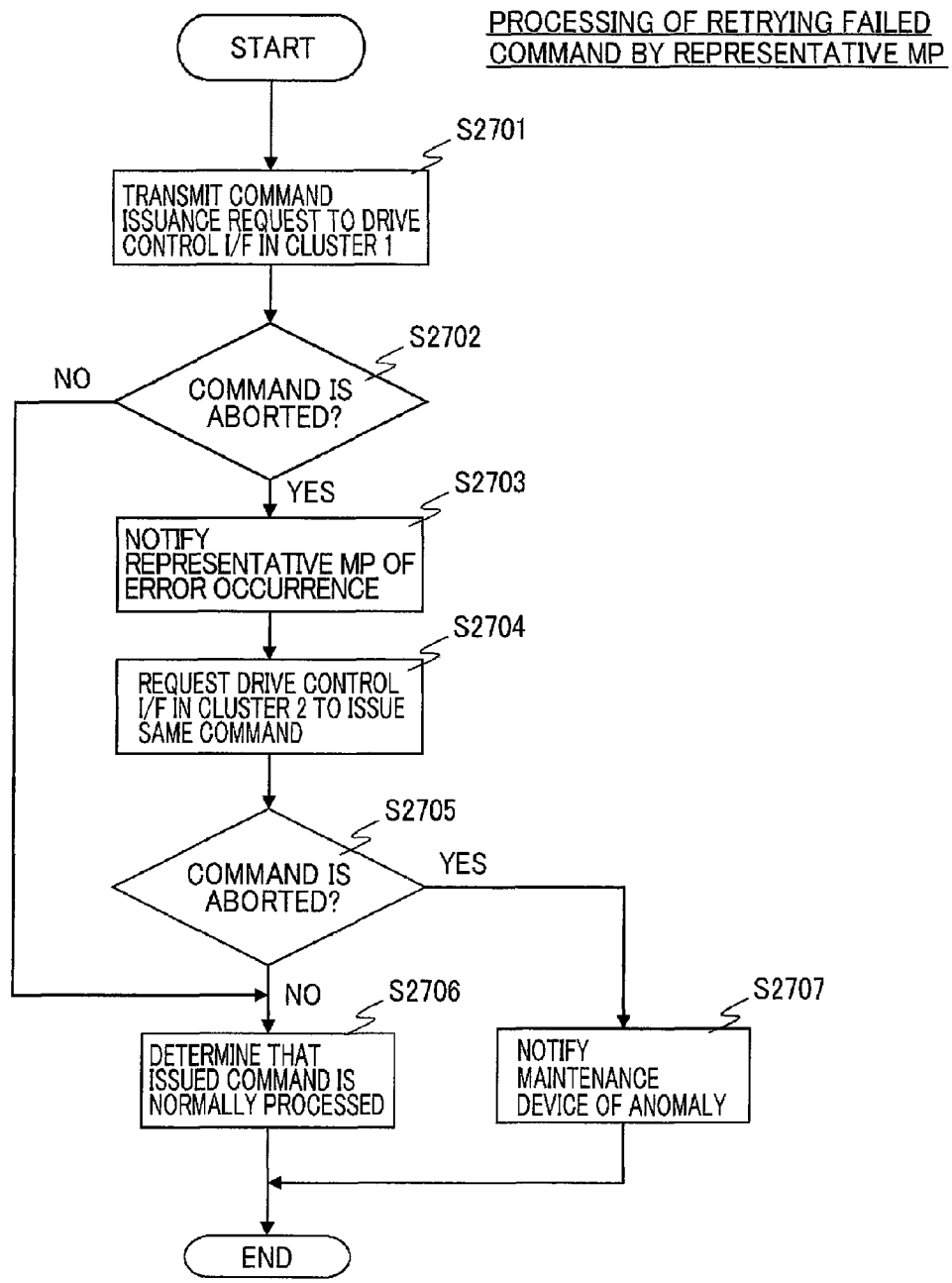
FIG. 27 is a diagram showing an exemplary processing flow for retrying a failed command by using another port.

Hereinbelow, description will be provided for processing for a case where the representative MP 1503 notified of the occurrence of an error by a MP 1042 detecting the error in one of the drive unit devices 200 retries a command related to the error. FIG. 27 shows an exemplary processing flow in which the representative MP 1503 retries a failed command. When the MP 1042 detects an error in which a command addressed to any of the drive unit devices 200 fails to be processed normally, the MP 1042 notifies the representative MP 1503 of the error, and the representative MP 1503 retries the command by using another cluster to check whether or not the drive unit device 200 continues to be usable by using the other cluster. This processing flow is executed by, for example, the power supply monitoring MP management unit 1302 in the power supply monitoring unit 1300.

Firstly, the MP 1042 in the cluster 1 transmits a command issuance request to the drive control I/F 1054 in the controller device 100 (S2701), and determines whether or not the command is aborted, by detecting the command timeout shown in FIG. 20A or the reply including the message indicating the unknown destination shown in FIG. 20B (S2702). When determining that the command is aborted (S2702: Yes), the MP 1042 detecting the error identifies the representative MP 1503 for the MP 1042 itself in reference to the ownership management table 1500, and notifies the representative MP 1503 of information on the error occurrence (S2703). This information includes the destination (address) and the content of the aborted command.

Upon receipt of the information on the error occurrence, the representative MP 1503 requests the drive control I/F 1054 included in the cluster 2 in the controller device 100 to issue the same command according to the received information (S2704). Then, the representative MP 1503 determines whether or not the requested command is aborted (S2705). When determining that the command is not aborted (S2705: No), the representative MP 1503 determines that the command re-issued by its own request is normally processed, and terminates the processing (S2706). In this case, the representative MP 1503 can determine that the cluster 2 is normally operating even though the error occurs in the cluster 1 in the drive unit 1, and therefore can block the data I/O path to the cluster 1.

On the other hand, when determining that the command re-issued by the request from the representative MP 1503 is aborted (S2705: Yes), the representative MP notifies the maintenance device 300 that both the cluster 1 and the cluster 2 in the drive unit 1 have errors, and terminates the processing (S2707).

In the above configuration, when any of the clusters has an error when using the drive unit device 200 in the storage apparatus 10, another cluster is tested to check whether or not the cluster will have an error. When no error occurs, the drive unit device 200 can be used continuously by using the other cluster. Thus, the usage ratio of the storage apparatus 10 can be enhanced while a load for maintenance work can be reduced.

Next, description will be provided for processing for a case where an error occurs in the representative MP 1503 that is to execute the processing for power supply monitoring and power failure detection in the present embodiment. As has been described for the ownership management tables 1500 in FIGS. 17 and 18, when an error occurs in the representative MP 1503, the MP 1402 selected as the redundant representative MP 1504 functions as the representative MP 1503 after replacement. This processing flow is executed by, for example, the power supply monitoring MP management unit 1302 in the power supply monitoring unit 1300.

Figure 28:
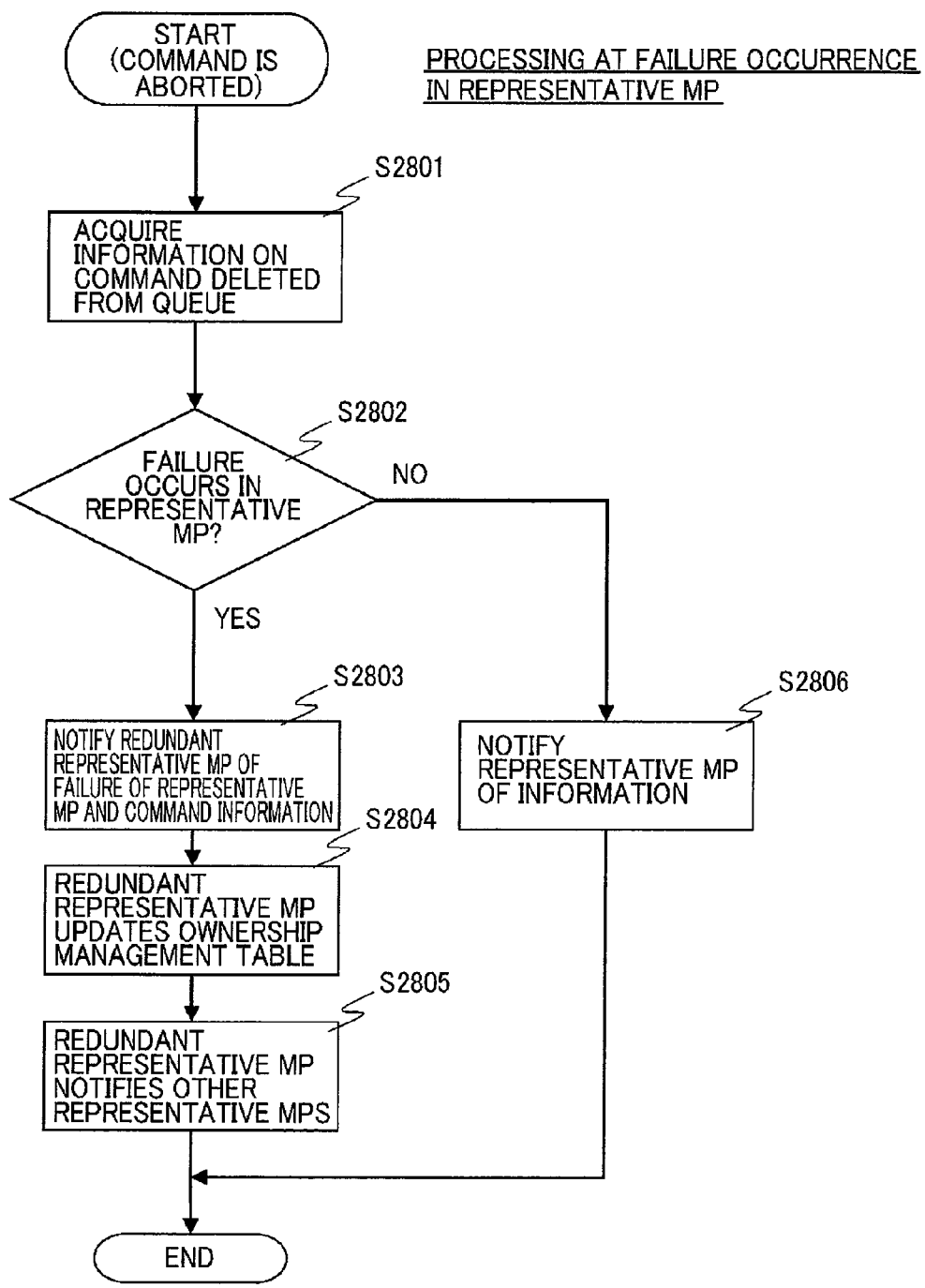
FIG. 28 is a diagram showing an exemplary processing flow for the case where a failure occurs in a representative MP in the present embodiment.

Firstly, in FIG. 28, the MP 1042 detecting an error in the command operation acquires information (the command issuance requester MP, the destination address and the process content) on a command deleted from the data queue 10541 in the drive control I/F 1054 (S2801), identifies the representative MP 1503 from the ownership management table 1500, and determines whether or not the representative MP 1503 has a failure (S2802). The failure information of the MP 1042 is recorded in the memory 1043 (local shared memory) in the MP board 104, for example.

When determining that the representative MP 1503 has the failure (S2802: Yes), the MP 1042 detecting the error identifies the redundant representative MP 1504 in reference to the ownership management table 1500, and notifies the identified redundant representative MP 1504 of the error occurrence and the information on the failed command (S2803).

Since the representative MP 1503 has the failure, the redundant representative MP 1504 accesses and updates the ownership management table 1500 by recording itself as the representative MP 1503 (S2804). Thereafter, the redundant representative MP 1504 which is now the new representative MP 1503 notifies the other representative MPs 1503 managing the other clusters of the error occurrence and the information on the failed command (S2805).

On the other hand, when determining that representative MP 1503 does not have the failure (S2802: No), the MP 1042 detecting the error in the command operation notifies the representative MP 1503 of the information of a command deleted from the data queue 10541 in the drive control I/F 1054, and terminates the processing (S2806).

In the above configuration, even when the representative MP 1503 in charge of the processing for power supply monitoring and power failure detection has a failure, the redundant representative MP 1504 continues to execute the processing for power supply monitoring and power failure detection in place of the representative MP 1503. Therefore, the processing function for dealing with a power failure can be maintained normally.

Example 2 in Present Embodiment

Figure 29:
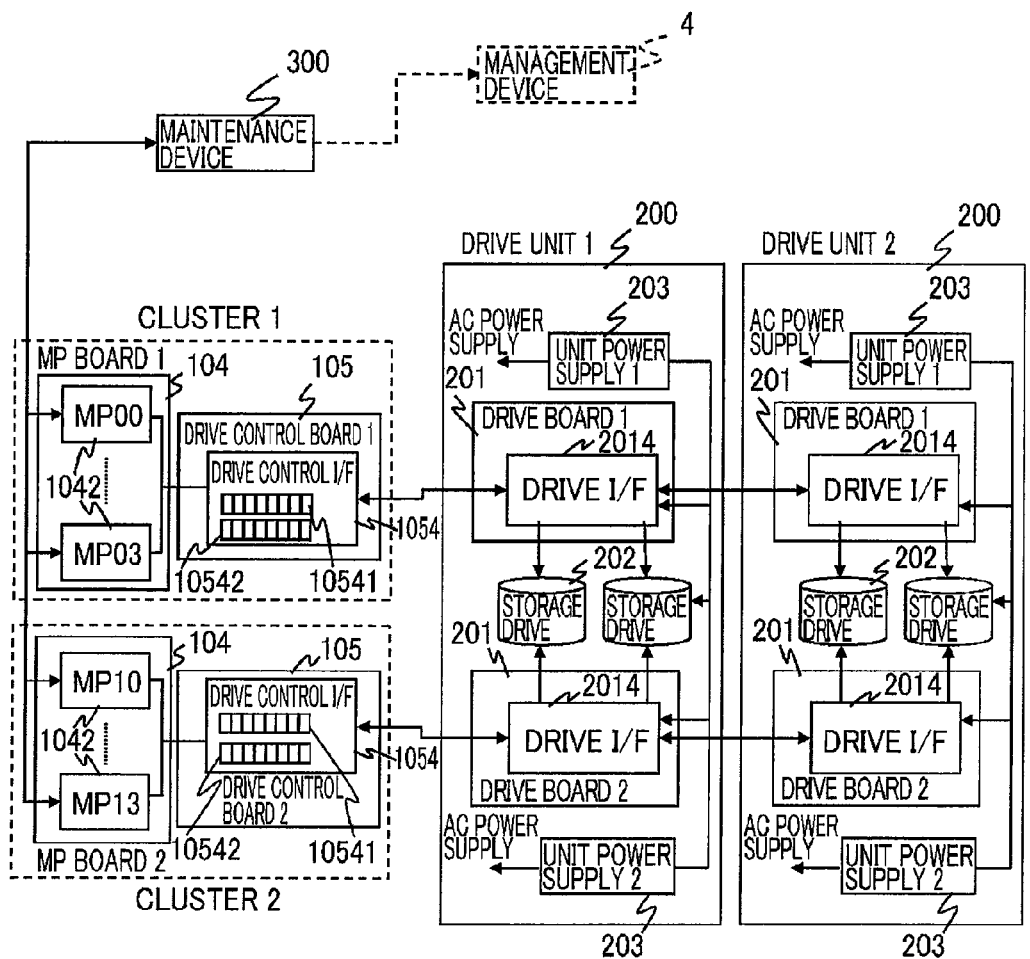
FIG. 29 is a schematic diagram showing another example of the exemplary power failure detection system in the present embodiment.

Next, description will be provided for a power failure detection system and its functions applied to a storage apparatus 10 in Example 2 of the present embodiment. FIG. 29 illustrates an exemplary power failure detection system according to Example 2. Since the overall configuration and component elements in FIG. 29 are almost the same as those in Example 1 shown in FIG. 15, the following explains different points from the configuration of Example 1.

In Example 1, the drive control I/F 1054 on the drive control board 105 in the controller device 100 is provided with the data data queue 10541 from which its stored data is deleted at the occurrence of a power failure, thereby to preferentially execute commands for processing of dealing with the power failure. A command deleted from the data queue 10541 at the occurrence of a failure, however, needs to be re-executed by each requester MP 1042 after the failure recovery, which produces a problem of increasing a processing load on the MP 1042.

In Example 2, as shown in FIG. 29, each drive control I/F 1054 is provided with a priority data queue 10542 in addition to a data queue 10541. In this example, the data queue 10541 sequentially stores therein commands for the ordinary data I/O processing. On the other hand, the priority data queue 10542 sequentially stores therein commands issued at the occurrence of a failure in response to requests from any of the MPs 1042 or the representative MP 1503 to execute the processing for power failure. At the occurrence of a power failure, the execution of ordinary commands stored in the data queue 10541 is suspended, while commands stored in the priority data queue 10542 are preferentially executed. Thus, the processing for power failure is executed in priority to the ordinary data I/O processing. In this way, the processing for power failure can be preferentially executed without deleting commands stored in the data queue 10541.

Figure 30A:
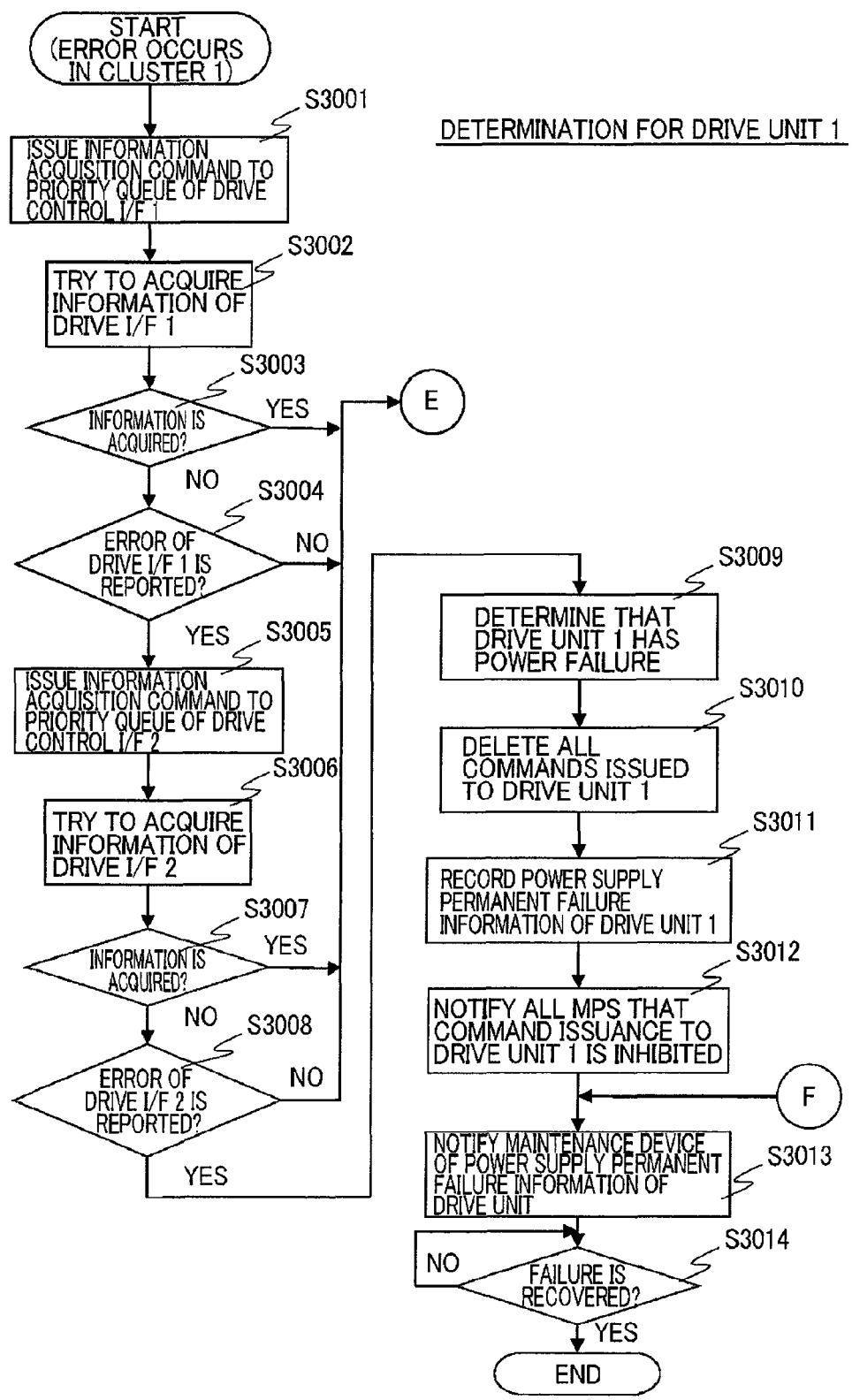
FIG. 30A is a diagram showing an exemplary processing flow for the case of a power failure in the configuration in FIG. 29.
Figure 30B:
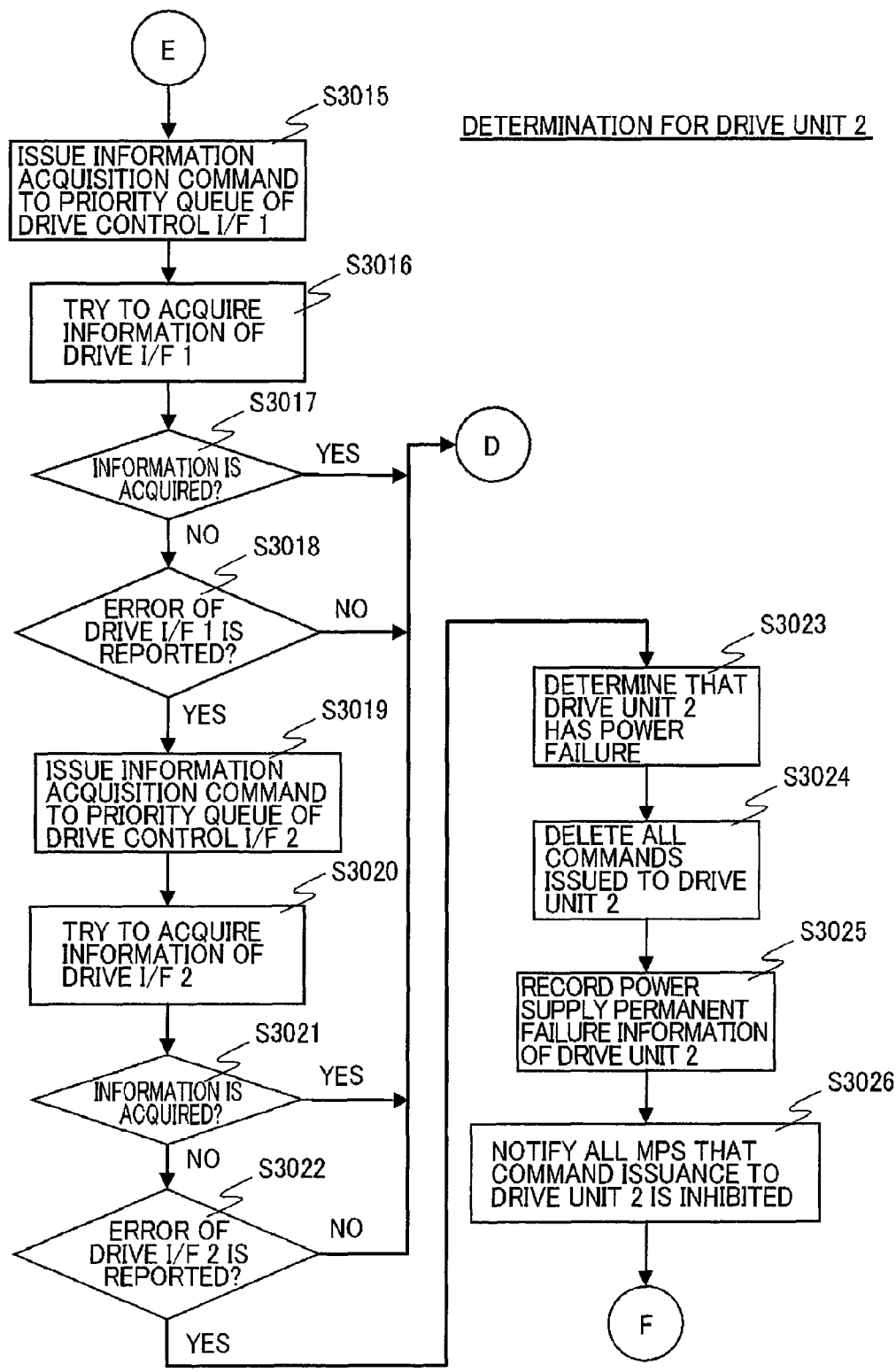
FIG. 30B is a diagram showing an exemplary processing flow for the case of a power failure in the configuration in FIG. 29.

FIGS. 30A and 30B show exemplary processing flows for the case of a power failure in Example 2. FIGS. 30A and 30B correspond to FIGS. 16A and 16B, respectively. Example 2 employs exactly the same processing flow as that in FIG. 16C, and hence the description thereof is omitted here. The processing flows in FIGS. 30A and 30B are almost the same as those in FIGS. 16A and 16B, but are different therefrom in some processing steps because of the provision of the priority data queue 10542. Specifically, in processing steps (S3001 and S3005 in FIGS. 30A and 53015 and S3019 in FIG. 30B), the MP 1042 detecting the occurrence of an error requests to issue commands to acquire information on a failed command, and the issued commands are stored in the priority data queue 10542 while commands stored in the in the data queue 10541 are kept stored. Since the processing flow except these processing steps is the same as that in Example 1, the description thereof is omitted here.

In the above configuration, at the occurrence of an error in which a command fails to be processed normally in any of the clusters, commands for the power failure detection processing can be preferentially executed without deleting commands already issued. Thus, no deleted commands need to be re-executed, thereby preventing an increase in the processing load on each of the MPs 1042.

Figure 31:
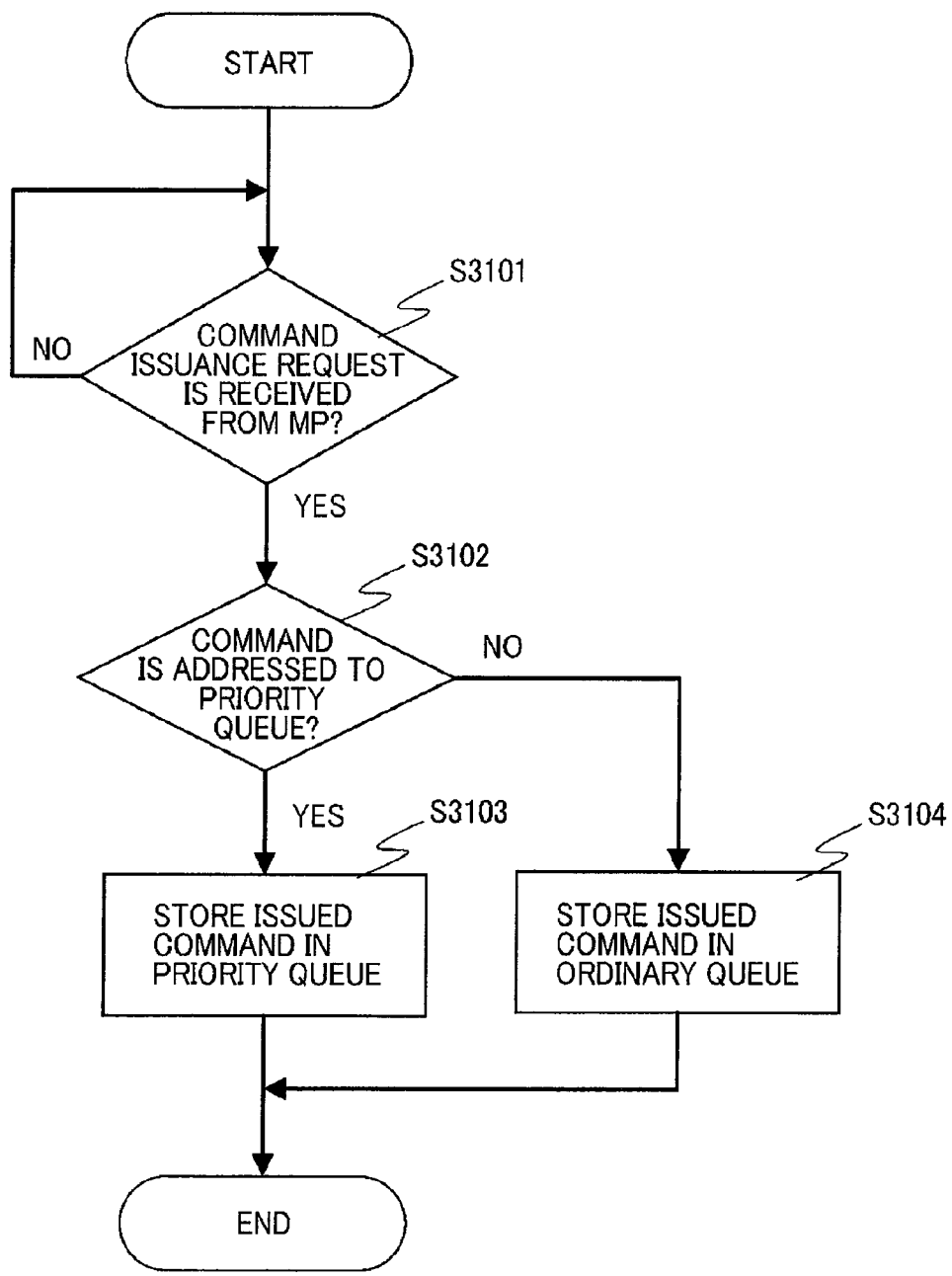
FIG. 31 is a diagram showing an exemplary processing flow for issuing a command in the configuration in FIG. 29.

FIG. 31 shows an exemplary processing flow for controlling issuances of commands to the data queue 10541 and the priority data queue 10542 in the drive control I/F 1054. This processing flow is executed by, for example, the power supply monitoring MP management unit 1302 in the power supply monitoring unit 1300. The drive control I/F 1054 waits for reception of a command issuance request from the MP 1042 (S3101: No). When determining that the request is received (S3101: Yes), the drive control I/F 1054 determines whether or not the command specified by the received issuance request is to be stored in the priority data queue 10542 (S3102).

When determining that the command is addressed to the priority data queue 10542 (S3102: Yes), the drive control I/F 1054 issues the requested command, stores the command in the priority data queue 10542 (S3103), and terminates the processing. When determining that the command is not addressed to the priority data queue 10542 (S3102: No), the drive control I/F 1054 issues the requested command, stores the command in the data queue 10541 (ordinary data queue) (S3104), and terminates the processing.

For a determination as to whether or not each command is addressed to the priority data queue 10542, a priority identification flag is attached to a command requested to be issued by the MP 1042 for the processing for power supply monitoring and power failure detection in the present embodiment. The priority identification flag indicates that the command is addressed to the priority data queue 10542. When receiving a command issuance request including the priority identification flag, the drive control I/F 1054 stores the command in the priority data queue 10542. Note that, although one priority data queue 10542 is provided in Example 2, two or more priority data queues 10542 may be provided. In this case, an attribute representing a rank in the priority order may be added to the identification flag, and thereby commands to be preferentially processed may be further classified into different levels of priorities in the execution order.

Hereinabove, the present invention has been described based on the embodiments thereof. The storage apparatus and the method of detecting a power failure in a storage apparatus according to the embodiments are capable of producing the following technological effects.

Since the drive unit device 200 does not have to be equipped with a dedicated power supply monitor circuit, a dedicated network line used for communications between the power supply monitor circuit and the MPs does not needs to be provided between the controller device 100 and the drive unit device 200. Accordingly, down-sizing, higher-density packaging and cost down for manufacturing of the storage apparatus 10 can be achieved. In addition, a general-purpose storage apparatus not including a circuit only for power supply monitoring can be used as the drive unit device 200. Thus, manufacturing and maintenance costs can be reduced.

The data queue 10541 is provided to the drive control I/F 1054 in the controller device 100. At the occurrence of a failure, commands stored in the data queue 10541 are once deleted and commands for the power failure detection processing are executed preferentially. Thus, the occurrence of the power failure can be quickly detected.

In addition, the priority data queue 10542 is also provided to the drive control I/F 1054 in the controller device 100. Then, at the occurrence of a failure, commands for the power failure detection processing are stored in the priority data queue 10542 and executed in priority to commands for the ordinary data I/O processing. This configuration enables the occurrence of the power failure to be quickly detected without deleting the commands in the data queue 10541. Moreover, since the commands stored in the data queue 10541 are not deleted, no deleted commands need to be re-issued after the failure recovery. Thus, the data processing efficiency of the MPs is not lowered at all.

Although the present embodiment has been described above, the foregoing embodiments are intended to make the present invention easy to understand, and not intended to limit the interpretation of the present invention. The present invention can be modified and improved without departing from the spirit thereof, and also includes any equivalent to the present invention.

The invention claimed is:

1. A storage apparatus comprising:
a storage drive configured to provide a physical storage area for creating a logical storage area to be used by an external apparatus;
a drive interface unit configured to input and output data to and from the storage drive;
a power supply unit configured to supply operation power to the storage drive and the drive interface unit; and
a storage controller including a plurality of processing units and a drive control interface unit, the processing units configured to execute via the drive interface unit data write processing from the external apparatus to the storage drive and data read processing from the storage drive, the drive control interface unit configured to issue a command to the drive interface unit in response to a request from each of the processing units, wherein
the power supply unit inputs power supply information to the drive interface unit, the power supply information indicating an operation state of the power supply unit,
any one of the plurality of processing units acquires the power supply information of the power supply unit through a data network path to the drive interface unit for the data write processing and the data read processing, and determines whether or not a failure occurs in the power supply unit supplying the operation power to the storage drive and the drive interface unit, on the basis of the acquired power supply information,
wherein the drive control interface unit includes a data queue in which the command issued in response to the request from any one of the plurality of processing units is stored and held, and
when any one of the plurality of processing units detects an error in an operation of the command, the command held in the data queue is deleted, and power failure detection process commands each issued in response to a request made by any one of the plurality of processing units for power failure detection processing are stored in the data queue from the top thereof and are sequentially processed.

2. The storage apparatus according to claim 1, wherein the error
the error in the operation of the command detected by any one of the plurality of processing units includes a command timeout of the command issued by the drive control interface unit to the drive interface unit directly coupled to the drive control interface unit, and a reply including information indicating that the command issued to another drive control interface unit coupled to the drive control interface unit is addressed to an unknown destination,
the storage apparatus includes a first cluster and a second cluster sectioned by a power supply border,
each of the first cluster and the second cluster includes the plurality of processing units, the drive control interface unit, the drive interface unit and the power supply unit,
when any one of the processing units in the first cluster detects an error in the operation of the command, the processing unit that has detected the error requests the drive control interface unit in the second cluster to issue the same command as the command having the error,
when any of the processing units detects an error in the operation of the command in any of the first cluster and the second cluster, the processing unit that has detected the error tries to acquire the power supply information from both of the drive interface unit in the first cluster and the drive interface unit in the second cluster, and determines that a power failure occurs in the power supply unit supplying the operation power to both of the drive interface units if the power supply information fails to be received from both of the drive interface units,
the storage controller records the command held in the data queue and an ID of the processing unit being an issuance requester of the command, while associating the command with the ID of the processing unit as the issuance requester,
after power failure recovery, one of the processing units refers to correspondence between the command and the ID of the processing unit as the issuance requester, and thereby requests each processing unit being the issuance requester of the command deleted from the data queue to re-issue the deleted command,
in the storage controller, one of the plurality of processing units is recorded as a representative processing unit to execute the power failure detection processing, and another one of the processing units is recorded as a backup processing unit to execute the power failure detection processing in place of the representative processing unit when the representative processing unit has a failure,
when any one of the plurality of processing units detects a failure in the representative processing unit, the processing unit that has detected the failure notifies the backup processing unit, and the backup processing unit thus notified records itself as the representative processing unit in the storage controller,
the drive control interface unit includes a priority data queue in addition to the data queue, the priority data queue used to store and hold the power failure detection process commands each issued in response to the request made by any one of the plurality of processing units, and
when any one of the plurality of processing units detects an error in the operation of the command, the drive control interface unit stores the power failure detection process commands each issued in response to the request from one of the processing units, in the priority data queue from the top thereof, and the power failure detection process commands thus stored are sequentially processed in priority to the command stored in the data queue.

3. The storage apparatus according to claim 1, wherein
the error in the operation of the command detected by any one of the plurality of processing units includes a command timeout of the command issued by the drive control interface unit to the drive interface unit directly coupled to the drive control interface unit, and a reply including information indicating that the command issued to another drive control interface unit coupled to the drive control interface unit is addressed to an unknown destination.

4. The storage apparatus according to claim 1, wherein
the storage apparatus includes a first cluster and a second cluster sectioned by a power supply border,
each of the first cluster and the second cluster includes the plurality of processing units, the drive control interface unit, the drive interface unit and the power supply unit, and
when any one of the processing units in the first cluster detects an error in the operation of the command, the processing unit that has detected the error requests the drive control interface unit in the second cluster to issue the same command as the command having the error.

5. The storage apparatus according to claim 4, wherein
when any of the processing units detects an error in the operation of the command in any of the first cluster and the second cluster, the processing unit that has detected the error tries to acquire the power supply information from both of the drive interface unit in the first cluster and the drive interface unit in the second cluster, and determines that a power failure occurs in the power supply unit supplying the operation power to both of the drive interface units if the power supply information fails to be received from both of the drive interface units.

6. The storage apparatus according to claim 1, wherein
the storage controller records the command held in the data queue and an ID of the processing unit being an issuance requester of the command, while associating the command with the ID of the processing unit as the issuance requester,
after power failure recovery, one of the processing units refers to correspondence between the command and the ID of the processing unit, and thereby requests each processing unit being an issuance requester of the command deleted from the data queue to re-issue the deleted command.

7. The storage apparatus according to claim 1, wherein
in the storage controller, one of the plurality of processing units is recorded as a representative processing unit to execute the power failure detection processing, and another one of the processing units is recorded as a backup processing unit to execute the power failure detection processing in place of the representative processing unit when the representative processing unit has a failure, and
when any one of the plurality of processing units detects a failure in the representative processing unit, the processing unit that has detected the failure notifies the backup processing unit, and the backup processing unit thus notified records itself as the representative processing unit in the storage controller.

8. The storage apparatus according to claim 7, wherein
the representative processing unit and the backup processing unit are provided for the entire storage apparatus, or each of a first cluster and a second cluster sectioned by a power supply border.

9. The storage apparatus according to claim 1, wherein
the drive control interface unit includes a priority data queue in addition to the data queue, the priority data queue used to store and hold the power failure detection process commands each issued in response to the request made by any one of the plurality of processing units, and
when any one of the plurality of processing units detects an error in the operation of the command, the drive control interface unit stores the power failure detection process commands each issued in response to the request from one of the processing units, in the priority data queue from the top thereof, and the power failure detection process commands thus stored are sequentially processed in priority to the command stored in the data queue.

10. A method of detecting a power failure in a storage apparatus including: a storage drive configured to provide a physical storage area for creating a logical storage area to be used by an external apparatus;
a drive interface unit configured to input and output data to and from the storage drive;
a power supply unit configured to supply operation power to the storage drive and the drive interface unit; and
a storage controller including a plurality of processing units and a drive control interface unit, the processing units configured to execute, via the drive interface unit, data write processing from the external apparatus to the storage drive and data read processing from the storage drive, the drive control interface unit configured to issue a command to the drive interface unit in response to a request from each of the processing units, the method comprising:
inputting power supply information from the power supply unit to the drive interface unit, the power supply information indicating an operation state of the power supply unit, and
acquiring, by any one of the plurality of processing units, the power supply information of the power supply unit through a data network path to the drive interface unit for the data write processing and the data read processing, and determining, by the processing unit, whether or not a failure occurs in the power supply unit supplying the operation power to the storage drive and the drive interface unit, on the basis of the acquired power supply information,
wherein the drive control interface unit includes a data queue in which the command issued in response to the request from any one of the plurality of processing units is stored and held, and
when any one of the plurality of processing units detects an error in an operation of the command, the command held in the data queue is deleted and power failure detection process commands each issued in response to a request made by any one of the plurality of processing units for power failure detection processing are stored in the data queue from the top thereof and are sequentially processed.

11. The method of detecting a power failure in a storage apparatus according to claim 10, wherein
the storage apparatus includes a first cluster and a second cluster sectioned by a power supply border,
each of the first cluster and the second cluster includes the plurality of processing units, the drive control interface unit, the drive interface unit and the power supply unit, and
when any one of the processing units in the first cluster detects an error in the operation of the command, the processing unit that has detected the error requests the drive control interface unit in the second cluster to issue the same command as the command having the error.

12. The method of detecting a power failure in a storage apparatus according to claim 11, wherein
when any of the processing units detects an error in the operation of the command in any of the first cluster and the second cluster, the processing unit that has detected the error tries to acquire the power supply information from both of the drive interface unit in the first cluster and the drive interface unit in the second cluster, and determines that a power failure occurs in the power supply unit supplying the operation power to both of the drive interface units if the power supply information fails to be received from both of the drive interface units.

13. The method of detecting a power failure in a storage apparatus according to claim 10, wherein the drive control interface unit includes a priority data queue in addition to the data queue, the priority data queue used to store and hold the power failure detection process commands each issued in response to the request made by any one of the plurality of processing units, and when any one of the plurality of processing units detects an error in the operation of the command, the drive control interface unit stores the power failure detection process commands each issued in response to the request from one of the processing units, in the priority data queue from the top thereof, and the power failure detection process commands thus stored are sequentially processed in priority to the command stored in the data queue.

* * * * *